(12) United States Patent
Bennett et al.

(10) Patent No.: US 9,920,566 B1
(45) Date of Patent: Mar. 20, 2018

(54) ENCAPSULATED GLASS FRAME ASSEMBLIES AND ASSOCIATED METHODS FOR FORMING SAME

(71) Applicants: AGC Automotive Americas R&D, Inc., Ypsilanti, MI (US); AGC Flat Glass North America, Inc., Alpharetta, GA (US)

(72) Inventors: Daniel Bennett, Tecumseh, MI (US); David W. Lahnala, Adrian, MI (US); Joel Jerrim, White Lake, MI (US)

(73) Assignees: AGC AUTOMOTIVE AMERICAS R&D, INC., Ypsilanti, MI (US); AGC FLAT GLASS NORTH AMERICA, INC., Alpharetta, GA (US)

( * ) Notice: Subject to any disclaimer, the term of this patent is extended or adjusted under 35 U.S.C. 154(b) by 0 days.

(21) Appl. No.: 15/486,438

(22) Filed: Apr. 13, 2017

Related U.S. Application Data

(60) Provisional application No. 62/415,887, filed on Nov. 1, 2016.

(51) Int. Cl.
*E06B 1/26* (2006.01)
*E06B 3/54* (2006.01)
*B60J 1/00* (2006.01)

(52) U.S. Cl.
CPC ............... *E06B 1/26* (2013.01); *B60J 1/007* (2013.01); *E06B 3/5454* (2013.01)

(58) Field of Classification Search
CPC ............ E06B 1/26; E06B 3/5454; B60J 1/007
See application file for complete search history.

(56) References Cited

U.S. PATENT DOCUMENTS 4,671,013 A * 6/1987 Friese .................... B60J 1/1861
  296/146.2
5,617,695 A * 4/1997 Brimmer ............. E06B 3/26338
  49/DIG. 1

(Continued)

FOREIGN PATENT DOCUMENTS

DE       3203580 A1   9/1983
DE       3932724 A1   4/1991

(Continued)

OTHER PUBLICATIONS

Hexpol Group, "Dryflex, Mediprene, Lifoflex—TPE Processing Guide", downloaded from http://www.hexpoltpe.com/getfile.php?type=site_documents&id=tpe-processing-guide.pdf in May 2016, pp. 1-10.

(Continued)

*Primary Examiner* — Jeanette E Chapman
(74) *Attorney, Agent, or Firm* — Howard & Howard Attorneys PLLC

(57) ABSTRACT

An encapsulated glass assembly includes a glass panel and a plastic frame coupled to the glass panel and an encapsulant for securing the frame to the panel. The frame includes at least three sides, wherein at least two and less than all of the at least three sides of the frame have a C-shaped channel extending within an outer frame surface and wherein another one side of the at least three sides does not have a C-shaped channel. The panel is introduced onto the inner surface of the lower wall portion of the another one side and then slid within each one of the C-shaped channels on the at least two sides. An encapsulant is bonded onto the panel and frame to secure the frame to the panel. The encapsulant has a Shore hardness less than the Shore hardness of the frame.

21 Claims, 11 Drawing Sheets

(56) References Cited

U.S. PATENT DOCUMENTS

| | | | | |
|---|---|---|---|---|
| 5,628,155 | A * | 5/1997 | Nolte | E06B 5/165 52/204.54 |
| 5,713,167 | A * | 2/1998 | Durham | E06B 1/345 52/204.54 |
| 5,944,324 | A | 8/1999 | Schultheis et al. | |
| 6,223,470 | B1 * | 5/2001 | Millard | B60J 1/1861 49/352 |
| 6,409,251 | B1 * | 6/2002 | Kaye | B60J 10/265 296/146.9 |
| 6,766,617 | B2 * | 7/2004 | Purcell | B60J 1/1853 49/360 |
| 9,126,474 | B2 * | 9/2015 | Cicala | B60J 1/1853 |
| 2010/0122495 | A1 * | 5/2010 | Lahnala | E05D 15/0686 49/358 |
| 2011/0214717 | A1 * | 9/2011 | Halahmi | B32B 17/10036 136/251 |
| 2012/0139289 | A1 * | 6/2012 | Lahnala | B60J 1/1853 296/146.16 |
| 2013/0185973 | A1 * | 7/2013 | Scheyer | A47G 1/065 40/735 |
| 2014/0230333 | A1 * | 8/2014 | Lahnala | B60J 1/1853 49/408 |

FOREIGN PATENT DOCUMENTS

| | | |
|---|---|---|
| DE | 4008702 A1 | 9/1991 |
| EP | 0076924 A2 | 4/1983 |
| FR | 2970756 A1 | 7/2012 |

OTHER PUBLICATIONS

English language abstract and machine-assisted English translation for DE 32 03 580 extracted from espacenet.com database on Nov. 6, 2017, 9 pages.

English language abstract and machine-assisted English translation for DE 39 32 724 extracted from espacenet.com database on Nov. 6, 2017, 6 pages.

English language abstract and machine-assisted English translation for DE 40 08 702 extracted from espacenet.com database on Nov. 6, 2017, 9 pages.

English language abstract and machine-assisted English translation for EP 0 076 924 extracted from espacenet.com database on Nov. 6, 2017, 12 pages.

English language abstract and machine-assisted English translation for FR 2 970 756 extracted from espacenet.com database on Nov. 6, 2017, 9 pages.

* cited by examiner

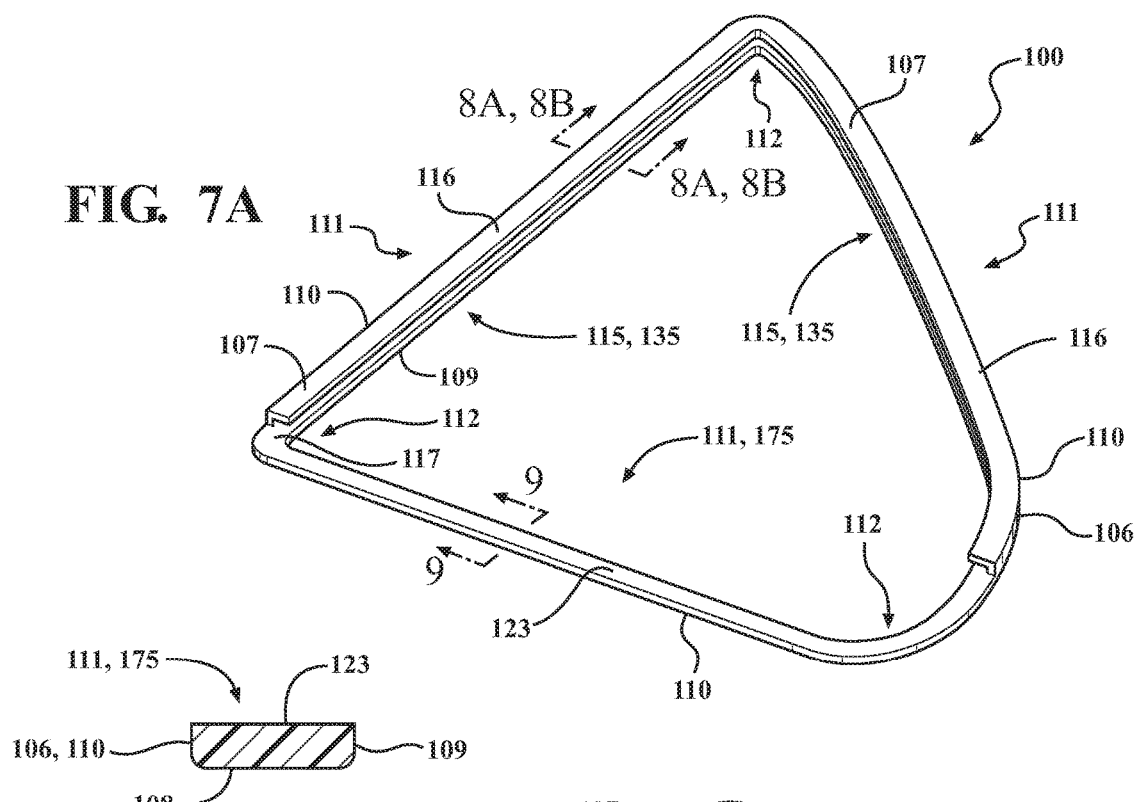
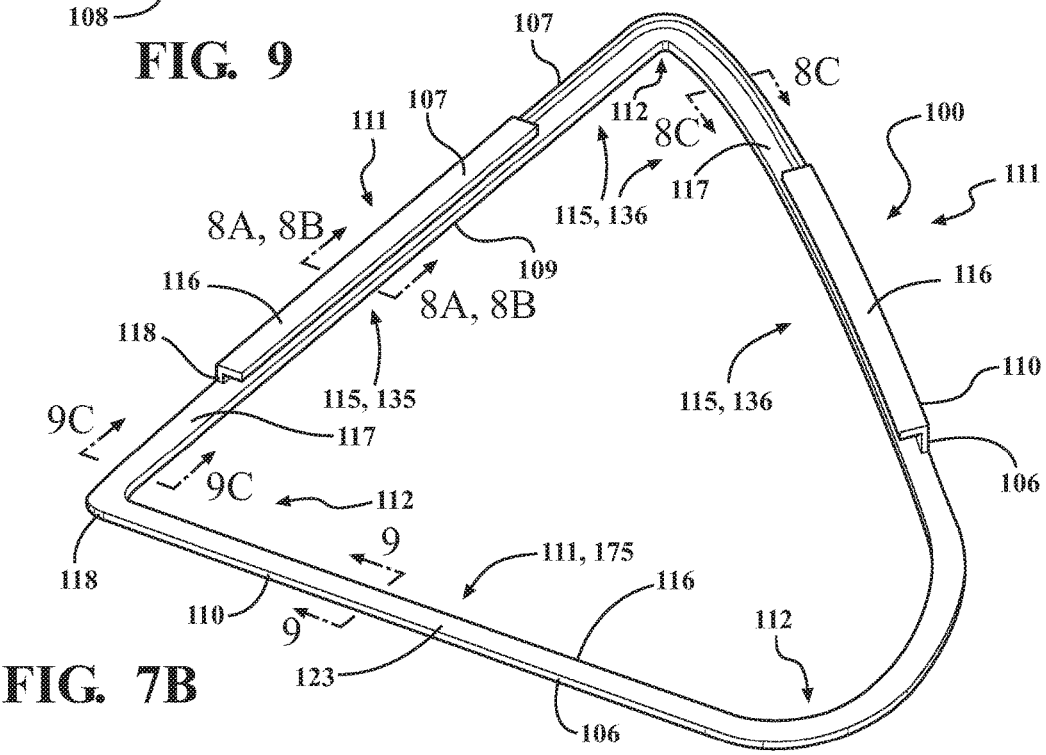

ENCAPSULATED GLASS FRAME ASSEMBLIES AND ASSOCIATED METHODS FOR FORMING SAME

CROSS-REFERENCE TO RELATED APPLICATIONS

This application claims priority to and all advantages of U.S. Provisional Application No. 62/415,887, filed on Nov. 1, 2016, the content of which is incorporated by reference.

BACKGROUND OF THE INVENTION

1. Field of the Invention

The subject invention generally relates to encapsulated glass frame assemblies and associated methods for forming encapsulated glass frame assemblies.

2. Description of the Related Art

Polymeric encapsulants for encapsulated glass frame assemblies (sometimes referred to as window assemblies), such as those used on vehicles, are generally known in the art. Generally, these encapsulated glass frame assemblies include a transparent pane, commonly made from glass (i.e., a glass panel). The polymeric encapsulant is bonded to the perimeter of the glass panel to form a frame for the glass panel. The polymeric encapsulant can be bonded to one, two, or three surfaces of the transparent pane.

The polymeric encapsulants can be formed from either a thermosetting material or a thermoplastic encapsulating material. Exemplary thermosetting encapsulating materials include, for example, a reaction injection molded (RIM) material, while exemplary thermoplastic encapsulating materials include, for example, polypropylene (PP), polyvinylchloride (PVC) or thermoplastic elastomers (TPEs). Non-limiting examples of TPE elastomers that can be used as the encapsulating material include SBS (poly(styrene-butadiene-styrene), also alternatively referred to as a styrene-butadiene-styrene block copolymer) and SEBS (styrene-ethylene-butylene-styrene block copolymers).

In certain applications, the polymeric encapsulant is applied in a single application step, and therein forms a one-shot encapsulant. In other applications, the polymeric encapsulant is applied in two separate applications steps with two separate polymeric materials, and therein forms a two-shot encapsulant having a first encapsulation layer and a second encapsulation layer such that the first encapsulation layer is between the transparent pane and the second encapsulation layer.

While such encapsulated glass frame assemblies including one-shot or two-shot encapsulants are generally suitable for their intended purpose, these encapsulated glass frame assemblies do suffer from a variety of known deficiencies related to bonding strength and structural rigidity of the formed encapsulants functioning as frames for the glass panels.

For example, certain encapsulating materials, such as TPE, bond well to the glass (with the use of adhesion promoters) and therefore prevent water from migrating between the applied encapsulant and the glass. TPE-based encapsulants also provide good sealing to the vehicle body because it is softer. However, because the TPE-based encapsulants are softer, they do not provide structural rigidity that allows the TPE-based encapsulants to fix the glass strongly to the vehicle.

Conversely, other encapsulating materials, such as polypropylene, form encapsulants providing enhanced structural rigidity relative to TPE-based encapsulants, and therefore can fix the glass strongly to the vehicle. However, polypropylene does not bond well to the glass itself, and therefore polypropylene-based encapsulants do not provide good sealing between the applied encapsulant and glass to prevent water from migrating between the polypropylene encapsulant and glass. Still further, in one example that is representative of general formation conditions for forming encapsulated glass frame assemblies with these other encapsulating materials providing the desired structural rigidity, polypropylene-based encapsulants require the use of an injection molding process to apply the polypropylene to the glass that requires both high barrel temperatures (ranging generally from about 400 to 450 degrees Fahrenheit (about 200 to 235 degrees Celsius)) and high injection pressures (ranging generally from about 6600 to 7250 pounds per square inch (about 4.62 to 5.20 MPa (MegaPascals))). with these temperatures and pressures being application dependent. Such high temperatures and pressures can result in the breakage of the glass panel during the injection molding process, particularly when the glass panel is a laminated glass panel.

The present invention addresses many of the deficiencies found in such encapsulated glass frame assemblies.

SUMMARY OF THE INVENTION AND ADVANTAGES

The invention provides encapsulated glass frame assemblies having as its major components a glass panel, a plastic frame, and an encapsulant.

In certain embodiments, the encapsulated glass assembly comprises a glass panel having a first side and a second side and an edge between the first side and the second side. the encapsulated glass assembly comprises a plastic frame having at least three sides and having a corner located between each adjacent side. The plastic frame also includes an outer frame surface. Each of the at least three sides of the plastic frame includes a lower wall portion extending within the outer frame surface, with the lower wall portion including an inner surface. The plastic frame also includes wherein at least two and less than all of the at least three sides of the plastic frame include a C-shaped channel extending within the outer frame surface, wherein each one of the C-shaped channels has the lower wall portion and an upper wall portion and a side wall portion connecting the lower wall portion to the upper wall portion, with the lower wall portion spaced from the upper wall portion. The plastic frame also includes wherein another one side of the at least three sides of the plastic frame includes the lower wall portion but does not include a C-shaped channel.

The glass panel is coupled to the plastic frame such that the glass panel is contained within each one of the C-shaped channels and such that an edge portion of the second side of the glass panel is adjacent to the inner surface of the lower wall portion along the another one side of the at least three sides of the plastic frame. The encapsulant is bonded to at least one of the first side and the second side of the glass panel and bonded onto the outer frame surface of the plastic frame to secure the glass panel to the plastic frame. The encapsulant has a Shore hardness less than a Shore hardness of the plastic frame (i.e., the encapsulant is softer than the plastic frame).

In certain of these embodiments, the glass panel is a laminated glass panel, while in other embodiments the glass panel is a tempered glass panel.

The present invention also provides a method for forming the encapsulated glass assemblies having the features described above.

The present invention thus provides simplified encapsulated glass assemblies having high strength and a simplified manufacturing process. In addition, the coupling of the plastic frame in accordance with the present invention forms encapsulated glass assemblies with high strength that cannot be reliably achieved using the one-shot or two-shot encapsulation techniques as described above. Still further, the application of the encapsulant onto the glass panel and frame to secure the glass panel to the frame in accordance with the present invention may be done at lower temperatures and pressures than required to bond high hardness plastic materials such as polypropylene to the glass panel, thus minimizing or preventing the breakage of the glass panels during the application process. Accordingly, the present invention allows the use of lower strength and better acoustical glass panels, such as laminated glass panels, in this manufacturing process. Still further, the encapsulant also provides a sealing and strong bond between the encapsulant and the glass panel, thus prevent minimizing or preventing water or other liquids from migrating between the applied encapsulant and glass panel prior to use or during use wherein the glass assembly is installed within a vehicle.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 7A is a perspective view of a plastic frame for use in the encapsulated glass assembly in accordance with one embodiment of the present invention;

FIG. 7B is a perspective view of a plastic frame for use in the encapsulated glass assembly in accordance with another embodiment of the present invention;

FIG. 9 is a section view of FIG. 7 taken along line 9-9;

DETAILED DESCRIPTION OF THE INVENTION

Referring to the Figures, wherein like numerals indicate corresponding parts throughout the several views, the present invention is directed to an encapsulated glass assembly 25 that may be used in a variety of applications. As illustrated herein, the encapsulated glass assembly 25 is included in a vehicle, such as an automobile.

Figure 1:
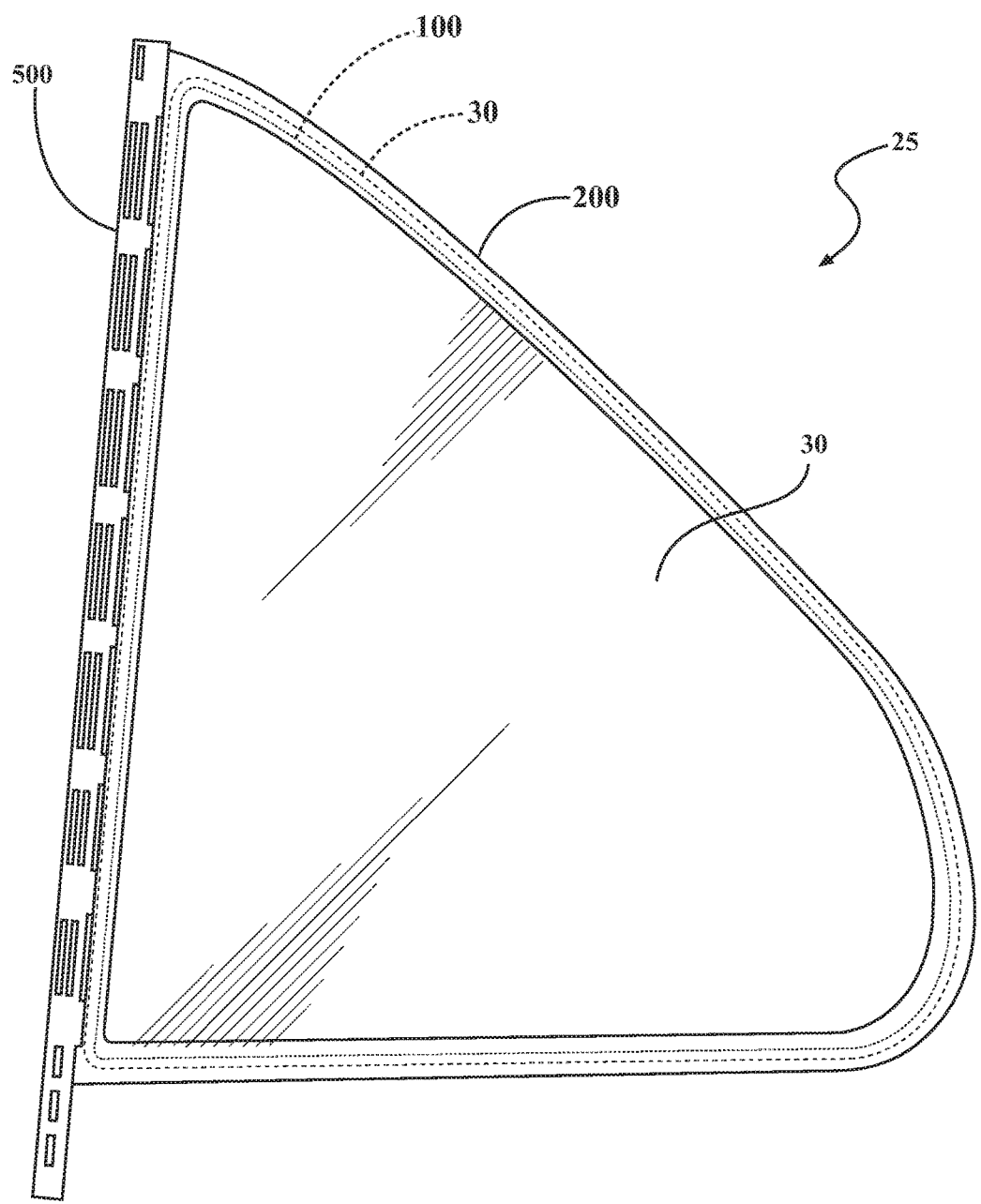
FIG. 1 is a perspective view of a glass assembly in accordance with one embodiment of the present invention.

Referring now to FIG. 1, the encapsulated glass assembly 25 includes, as its major components, a glass panel 30 coupled to a plastic frame 100. In addition, the encapsulated glass assembly 25 includes an encapsulant 200 that bonds to both the glass panel 30 and frame 100 and thus functions to secure the plastic frame 100 to the glass panel 30. Accordingly, the encapsulant 200 effectively functions as a second frame and may be alternatively referred to herein as a second frame.

As also shown in FIG. 1, the encapsulated glass assembly 25 may be coupled to, attached to, or is otherwise secured to a support frame 500. Alternatively, the support frame 500 may be integral with the plastic frame 100 (i.e., the support frame 500 and frame 100 are formed as a single component and not two separate components). The support frame 500 is contained within the vehicle (not shown), and thus the encapsulated glass assembly 25 may function as a window for the vehicle. In certain embodiment, the encapsulated glass assembly 25 is a side window coupled to the A-pillar of the vehicle adjacent to the driver's side or passenger side window, while in other embodiments The encapsulated glass assembly is a side window that is coupled to the C-pillar of the vehicle adjacent to the rear passenger side windows. In still further embodiments, the encapsulated glass assembly 25 may be included as a side portion of the front windshield.

Figure 2:
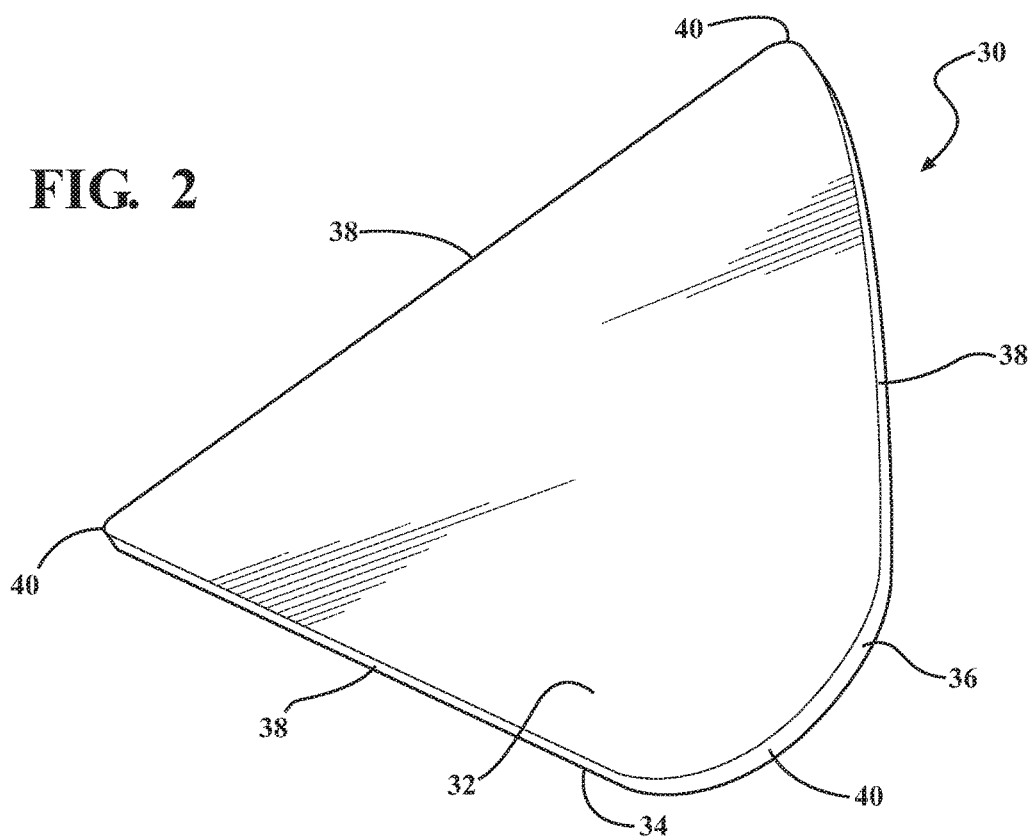
FIG. 2 is a perspective view of the glass panel of FIG. 1.

Referring to FIG. 2, the glass panel 30 includes, in general, a first side 32 and a second side 34 and an edge 36 between the first side 32 and the second side 34. Typically, when the glass panel 30 is installed within the vehicle (not shown), one side (i.e., one of the first side 32 or the second side 34) of the glass panel 30 is positioned towards the passenger compartment of the vehicle, and thus may define a portion of the passenger compartment, while the other side (i.e., the other one of the first side 32 or the second side 34) is positioned outwardly from the vehicle and away from the passenger compartment.

The glass panel 30 may be formed in any shape depending upon its use. Thus, for example, the glass panel 30 may be formed having at least three sides 38 defined along the edge 36. In these embodiments, each adjacent pair of the sides 38 may be connected by transition regions, or corners 40 (i.e., wherein the sides 38 and corners 40 collectively define the shape of the glass panel 30). Accordingly, in embodiments having three sides 38, such as when used as the side windows coupled to either the A-pillar or C-pillar of the vehicle through the support frame 500 as described above, the glass panel 30 may be triangular shaped. Still further, in embodiments have four sides 38 and four corners 40, the glass panel 30 may have a generally square or rectangular shape or may have another quadrilateral shape that does not generally define a square or rectangle. In these embodiments, the corners 40 may form abrupt transitions between sides 38 or may be generally rounded between the sides 38. In still further embodiments, the segment of the plastic frame 100 corresponding to one of the sides 38 may be straight along its length (as in a triangle or square), may be rounded, or may take on any other respective shape along the length of the side 38. Still further, in other embodiments, the transitions along the corners 40 may be slightly rounded or perfectly rounded, (i.e., less or not abrupt). In these embodiments, the sides 38 may correspond in roundness to the corners, and thus form round or oval parts to correspond to the round or oval shape of the glass panel 108. Thus, for example, wherein the glass panel 30 is round or oval, the sides 38 correspond to segments of a round or oval shaped plastic frame 100, and the corners 40 represent round or oval transitional segments between the respective round or oval segments. For illustrative purposes, the glass panel 30 in the embodiments illustrated herein have a triangular shape including three sides 38 and three corresponding corners 40, with one corner 40 positioned between each pair of adjacent sides 38.

Figure 3:
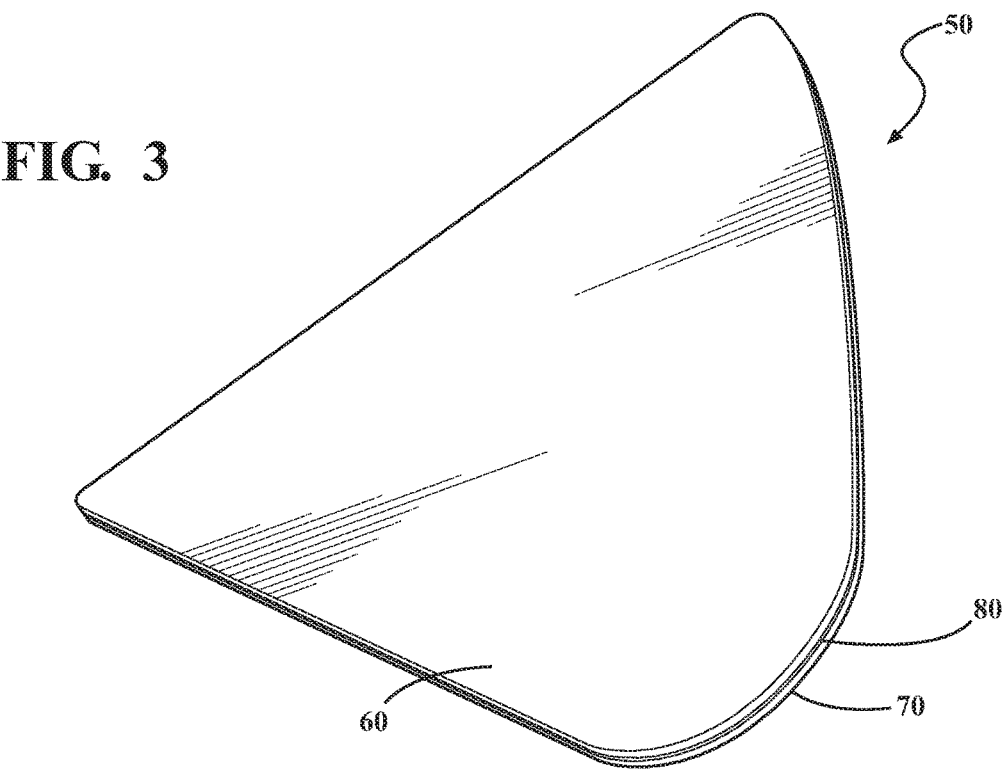
FIG. 3 is a perspective view of a laminated glass panel for use in The encapsulated glass assembly of one embodiment of the present invention.

In certain embodiments, the glass panel 30 is in the form of a laminated window assembly 50. As shown best in FIGS. 3 and 4, the laminated glass panel 50 includes an inner transparent sheet 60 and an outer transparent sheet 70 and an interlayer 80 disposed between the inner transparent sheet 50 and the outer transparent sheet 70.

In certain embodiments, the inner and outer transparent sheets 60, 70 are panes of glass that are substantially transparent. However, in other embodiments, the inner and outer transparent sheets 60, 70 may be plastic, fiberglass, or any other suitable substantially transparent material. As defined herein, the term "substantially transparent", as used with respect to the transparent sheets 60 and 70, refers to a material that allows 70% or more of light transmission in a predefined wavelength range, such as the visible light range. The panes of glass are preferably automotive glass and, more specifically, soda-lime-silica glass. However, in other embodiments, the inner and outer transparent sheets 60, 70 may be plastic, fiberglass, or other suitable substantially transparent material.

In other embodiments, the inner and outer transparent sheets 60, 70 are panes of glass that are less transparent. For example, wherein The encapsulated glass assembly is a privacy glass, the transparency of the glass is substantially reduced, and thus allows less than 70% light transmission in a predefined wavelength range, such as from greater than 0 to 70% light transmission at the predefined wavelength range. As used hereinafter, the term transparent, as it relates to the transparent sheets 60 or 70 or interlayer 80 of the present invention, or more generally as it relates to the glass panel 30, refers to a sheet or panel having at least some degree of transparency at the predefined wavelength range and is not intended to be limited to substantial transparent as defined in the previous paragraph.

Figure 4:
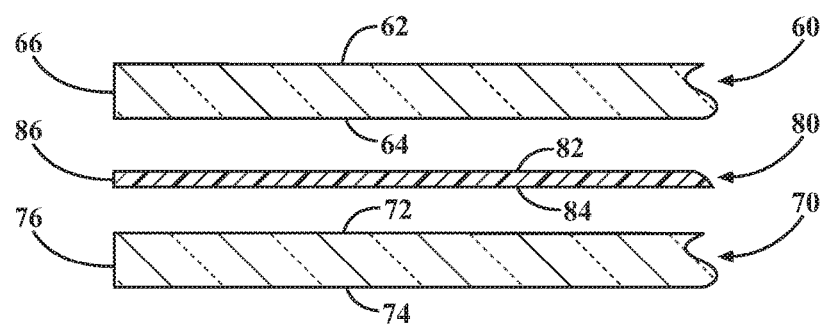
FIG. 4 is a side exploded view of FIG. 2.

As best shown in FIG. 4, the inner transparent sheet 60 includes a first side 62 and a second side 64 and an edge 66 defined between the first and second sides 62, 64. Similarly, the outer transparent sheet 70 includes a first side 72 and a second side 74 and an edge 76 defined between the first and second sides 72, 74.

As noted above, the laminated glass panel 50 also includes an interlayer 80 disposed between the inner and outer transparent sheets 60, 70. Preferably, the interlayer 80 bonds the inner and outer transparent sheets 60, 70 and allows the laminated glass panel 50 to retain glass panels piece upon impact or breakage.

The interlayer 80 typically is substantially transparent to light and includes a polymer or thermoplastic resin, such as polyvinyl butyral (PVB). However, other suitable materials for implementing the interlayer 80 may be utilized. Similar to the inner and outer transparent sheets 60, 70, the interlayer 80 is also substantially transparent or otherwise transparent to light, and accordingly the glass panel 50 assembled to include the interlayer 80 between the inner and outer transparent sheets 60, 70 is also substantially transparent or otherwise transparent to light. The interlayer 80 includes a first side 82 and a second side 84 and an edge 86 defined between the first and second sides 82, 84.

When assembled, the first side 82 of the interlayer 80 bonds to the second side 64 of the inner transparent sheet 60, and a second side 84 of the interlayer 80 bonds to a first side 72 of the second transparent sheet 70 such that the interlayer 80 bonds to each of the inner and outer transparent sheets 60, 70 to form the laminated glass panel 50.

When assembled, the relative thickness of each of the edges 66, 76, 86 of the laminated glass panel 50 corresponds to the edge 36 of the glass panel 30. In addition, the first surface 62 and the second surface 74 correspond to the first side 32 and second side 34, respectively, of the glass panel 30.

Figure 5:
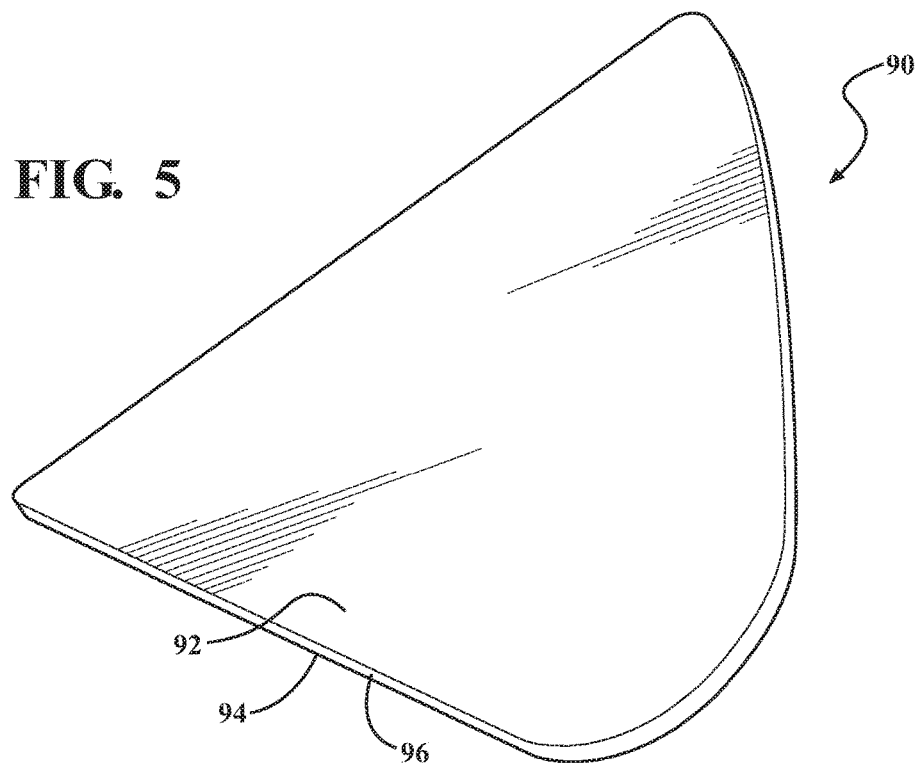
FIG. 5 is a perspective view of a tempered glass panel for use in The encapsulated glass assembly of another embodiment of the present invention.

As noted above, in another embodiment, the glass panel 30 is a tempered glass panel 90. As opposed to a laminated glass panel 50, a tempered glass panel 90 is a single layer glass panel that has been processed by controlled thermal or chemical treatments to increase its strength compared to normal glass (i.e., untampered or annealed glass). Accordingly, the tempered glass panel 90, as shown in FIG. 5, includes a first side 92 (which corresponds to the first side 32), a second side 94 (which corresponds to the second side 34), and an edge 96 (which corresponds to the edge 36) defined between the first and second sides 92, 94.

Figure 6:
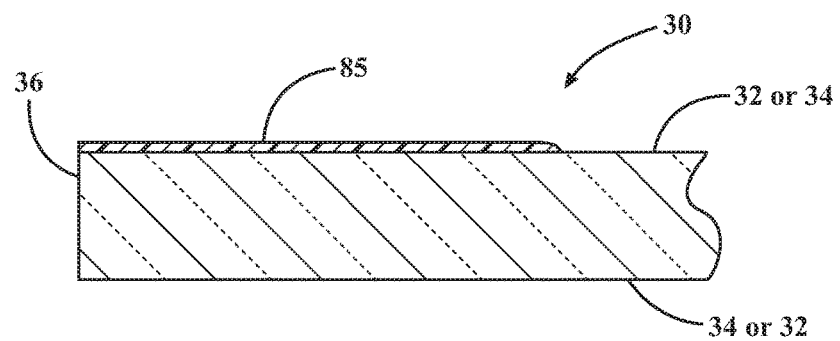
FIG. 6 is a side view of FIG. 2, 3 or 5 including a primer disposed on a portion of one side of the glass panel in accordance with another embodiment of the present invention.

In still further embodiments, such as illustrated in FIG. 6, the glass panel 30 of any of the embodiments described above may also include a primer 85 that is applied onto a portion of the first side 32, second side 34 and/or the edge 36 of the glass panel 30 (as shown in FIG. 7, the primer 85 is illustrated applied to a portion 31 of the first side 32 of the glass panel 30). The primer 85, as described in further detail below, may be applied to the glass panel 30 prior to its introduction within the plastic frame 100. Still further, as will also be described in further detail below, the primer 85 may be applied in conjunction with the application of the encapsulant 200 to the first side 32 and/or the second side 34 of the glass panel 30.

For ease in description hereinafter, the glass panel 30, 50, 90 of any of the above embodiments (including glass panels having a primer 85 as in FIG. 6), is hereinafter referred to as "the glass panel 30", which as noted above maybe be either in the form of a laminated glass panel 50 or a tempered glass panel 90. Accordingly, in each of the further Figures and descriptions, the description of any aspect of the glass panel 30 equally applies to the corresponding aspect of the laminated glass panel 50 or tempered glass panel 90. For example, a description of the first side 32 of the glass panel 30 also describes the first side 62 of the laminated glass panel 50 and to the first side 92 of the tempered glass panel 90.

In addition to the glass panel 30, the encapsulated glass assembly 25 also includes a plastic frame (shown as 100 in FIGS. 1 and 7-18) coupled to the glass panel 30 (i.e., wherein the glass panel 30 is introduced into the plastic frame 100). As used herein, the term "coupled to" can be used interchangeably with the term "installed" with respect to coupling the glass panel 30 to the plastic frame 100.

The plastic frame 100 is preferably formed from a hard plastic material and includes an outer frame surface (shown as 106 in FIGS. 7-18 below). In certain embodiments, the plastic material used in forming the plastic frame 100 is a material that, when formed to its final shape, has a Shore D hardness exceeding 50, such as from 55 to 95, such as from 70 to 85. Shore Hardness as described in the present invention may be measured with a durometer using the procedure described in ASTM D2240. In certain embodiments, the hard plastic material is polypropylene or a thermoplastic polyolefin (TPO) that is molded to a desired shape to form the plastic frame 100. In embodiments wherein the hard plastic material is polypropylene, the Shore D hardness ranges from 55 to 95, such as from 70 to 85.

In certain embodiments, the plastic frame 100 is a one-piece structure that is formed to generally coincide to the shape of the glass panel 30 such that the glass panel 30 may be contained within the plastic frame 100 when the glass panel 30 is coupled to the plastic frame 100. Exemplary one-piece frames 100 are described below. As noted above the glass panel described with respect to these respective glass assemblies 25 is designated by reference numeral 30 and includes the afore-mentioned first and second sides 32, 34 and edge 36 unless otherwise indicated. Still further, the glass panel 30 described in these assemblies can be either the laminated glass panel 50 or tempered glass panel 90 unless otherwise expressly specified.

In general, the plastic frame 100 is formed in its final shape prior to coupling to glass panel 30, or otherwise provided in its final shape prior coupling to the glass panel 30, as described in further detail below.

For polypropylene frame plastic frames 100, the manufacturing (i.e., molding) may be performed in an injection mold having a cavity portion having the desired dimensions and the shape, such as the dimensions and shapes for any of the plastic frames 100 illustrated in any one of the FIGS. 1 and 7-18 as described herein. In certain embodiments, the plastic frame 100 is molded in an injection mold (not shown). Exemplary, non-limiting injection molds that may be used include injection molding equipment commercially available from Krauss-Maffei Corporation of Munich, Germany. Exemplary molding conditions for forming any of the plastic frames 100 using the injection molding equipment commercially available from Krauss-Maffei Corporation are as follows: mold temperatures ranging from about 110 to 140 degrees Fahrenheit (about 43 to 60 degrees Celsius); injection pressures ranging from about 6600 to 7250 pounds per square inch (about 4.62 to 5.20 MPa (MegaPascals)); barrel temperatures ranging from 400 to 450 degrees Fahrenheit (about 204 to 232 degrees Celsius); and fill times ranging from 1.9 to 2 seconds.

Referring to FIGS. 7-18, as noted above, the plastic frame 100 in accordance with the present invention is generally shaped to coincide to the shape of the glass panel 30 so that the glass panel 30 can be coupled to, and preferably be at least partially contained within, the plastic frame 100. In embodiments wherein the glass panel 30 is formed having three or more outer sides 38 defined along the edge 36 and including outer corners 40 disposed between each adjacent pair of outer sides 38, the plastic frame 100 thus includes a corresponding number of adjacent sides 111 and corners 112, with each of the corners 112 defined as the transition between the adjacent sides 111.

In certain embodiments, the plastic frame 100 in accordance with the present invention has an outer frame surface 106 that includes an upper surface 107 and an opposing lower surface 108. An inner surface 109 and an opposing outer surface 110, respectively, connect the upper surface 107 to the lower surface 108. The terms upper and lower, as described herein with respect to any component, are not meant to imply a relative orientation of such component with respect to the earth. Accordingly, the upper surface 107 of the plastic frame 100 may be positioned closer or further from the earth relative to the lower surface 108 of the plastic frame 100 during use and should not be therefore considered limiting.

Figure 8A:
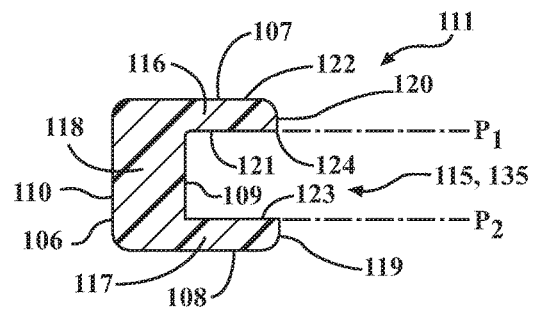
FIG. 8A is a section view of FIG. 7A or 7B taken along line 8A-8A.
Figure 8B:
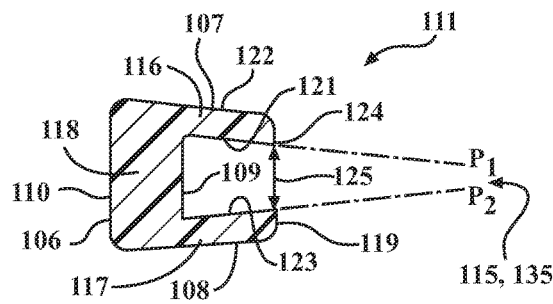
FIG. 8B is a section view of FIG. 7A or 7B taken along line 8B-8B in a modified embodiment of FIG. 8A.
Figure 8C:
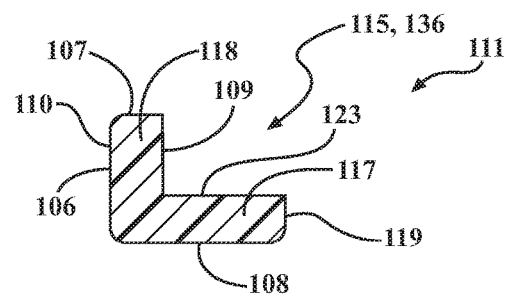
FIG. 8C is a section view of FIG. 7B taken along line 8C-8C.

In these embodiments, a channel 115 extends within the outer frame surface 106 of at least two, but not all, of the sides 111. The channel 115, as best shown in FIGS. 8A, 8B, and 8C has a lower wall portion 117 extending from a side wall portion 118, with the side wall portion 118. The lower wall portion 117 terminates at an edge portion 119 remote from the side wall portion 118. In addition, at least a portion of the channel 115 along at least two of the respective sides 111 of the plastic frame 100 includes at least one upper wall portion 116, with each one of the at least one upper wall portions 116 extending from the side wall portion 118 and spaced apart from the lower wall portion 117. Accordingly, a portion of the channel 115 along at least two of the respective sides 111 of the plastic frame 100 and having the upper wall portion 116 can further be defined as a C-shaped channel 135 (shown best in alternative embodiments in FIGS. 8A and 8B), whereas other portions of the channel 115 not having the upper wall portion 116 but having the lower wall portion 117 extending from the side wall portion 118 can further be defined as a respective L-shaped channel 136 (shown best in FIG. 8C).

In one embodiment in which the plastic frame 100 has exactly one upper wall portion 116, as shown in FIG. 7A, the upper wall portion 116 does not extend the entire length of the side wall portion 118 on each of the respective sides 111 and corners 112 of the plastic frame 100, but does extend along at least two adjacent sides 111 and includes each corresponding corner 112 between the two or more respective adjacent sides 111 (as shown in FIG. 7A, the upper wall portion extends along two adjacent sides 111 and one corner 112 between the two adjacent sides 111). In these embodiments, the channel 115 of at least two or more respective adjacent sides 111 (and the respective corner 112 between each pair of the respective adjacent sides 111) includes the upper wall portion 116 and therefore defines a single respective C-shaped channel 135 (as described above).

In still another alternative embodiment of the present invention, the plastic frame 100 may include a plurality of spaced apart upper wall portions 116 along two or more, but less than all, of the respective sides 111 of the plastic frame 100. In one representative depiction of this alternative embodiment, two or more respective sides 111 of the plastic frame 100 includes a respective single upper wall portion 116 positioned between the respective corners 112 that defines a corresponding respective C-shaped channel 135 and at least one L-shaped channel 136 (shown best in FIG. 8C) along the corresponding respective side 111 of the plastic frame 100. In this embodiment, the L-shaped channel 136 may extend from a single respective corner 112 and along a pair of adjacent sides 111 of the plastic frame 100 that extend from the single respective corner 112.

In one representative example of this alternative embodiment, as shown in FIG. 7B, a respective single upper wall portion 116 is included on each of a pair of adjacent sides 111 of the plastic frame 100, which thus defines a respective single C-shaped channel 135 on each of the adjacent sides 111. As the upper wall portion 116 on each side 111 does not extend to either respective corner 112 along the respective side 111, a pair of L-shaped channels 136 are also included on each respective side 111 on opposite ends of the C-shaped channel 135. In FIG. 7B, one of the L-shaped channels 136 extends along both respective adjacent sides 111 of the plastic frame 100 and along the corner 112 between the adjacent sides 111 of the plastic frame 100, while a second L-shaped channel 136 along each one of the respective side 111 is separated from the one of the L-shaped channels by the C-shaped channel 135 located on the respective side 111.

In yet another alternative embodiment (not shown), the plastic frame 100 includes two more upper wall portions 116 spaced apart relative to one another along a single side 111 of the plastic frame 100. Accordingly, in this embodiment, the respective side 111 includes at least two C-shaped channels 135, with each respective pair of C-shaped channels 135 along the single side 111 separated from one another by a respective L-shaped channel 136. In embodiments having exactly two upper wall portions 116 extending to each of the respective corners 112, exactly one L-shaped channel 136 is provided on the respective side 111 between the C-shaped channels 135. In embodiments having exactly two upper wall portions 116, but wherein only one of the upper wall portions 119 extends to one of the respective corners 112, the single side 111 includes two C-shaped channels 135 and two L-shaped channels 136. In embodiments having exactly two upper wall portions 116, but wherein neither one of the upper wall portions 116 extends to the respective corners 112, the single side 111 includes two C-shaped channels 135 and three L-shaped channels 136, wherein two of the three L-shaped channels 136 extends to a respective corner 112 along the one side 111 of the plastic frame 100.

As noted briefly above, each respective C-shaped channel 135 of the plastic frame 100, in accordance with any embodiment described above, and extending within the outer frame surface 106, is defined by a respective one of the upper wall portions 116, the side wall portion 118 connected to the respective upper wall portion 116, and the lower wall portion 117 extending from side wall portion 118, with the side wall portion 118 connecting the lower wall portion 117 to the respective upper wall portion 116. In these embodiments, each one of the respective upper wall portions 116 terminates at an edge portion 120 remote from the side wall portion 118 to which it is connected.

In addition, each respective one of the upper wall portions 116 of the plastic frame 100 also has an inner surface 121 defined between the side wall portion 118 and the respective edge portion 120. Yet still further, each respective one of the at least one upper wall portions 116 of the plastic frame 100 also has an outer surface 122 extending from the respective edge portion 120 such that the edge portion 120 connects the inner and outer surfaces 121, 122 of a respective one of the at least one upper wall portion 116 such that the inner surface 121 is located between the lower wall portion 117 and the outer surface 122. The outer surface 122 may be defined as a portion of the upper surface 107 or alternatively may be considered to extend from the upper surface 107.

In certain embodiments as shown in FIG. 8A, a plane P1 defined by the inner surface 121 of the upper wall portion 116 of the plastic frame 100 and a plane P2 defined by the inner surface 123 of the lower wall portion 117 of the plastic frame 100 extend in a direction substantially parallel to one another. In this embodiment, a gap 125, defined as the distance between the respective inner surfaces 121, 123 is constant in a direction away from the side wall portion 118. Preferably, this gap 125 is greater than the thickness of the glass panel 30 measured from the first side 32 to the second side 34 in a direction normal to the first and second side 32, 34.

Alternatively, the plane P1 and the plane P2 of the plastic frame 100 are not parallel with one another. Accordingly, as shown in one embodiment in FIG. 8B, the gap 125 between the respective inner surfaces 121, 123 decreases along the respective planes P1, P2 in a direction away from the side wall portion 118 (i.e., the planes P1, P2 will intersect at a distance remote and inward from the side wall portion 118). Preferably, the gap 125 between the inner surfaces 121, 123, measured in a direction normal to the inner surface 123 and extending to the edge 124 of the inner surface 121, is less than the thickness of the glass panel 30 measured from the first side 32 to the second side 34 in a direction normal to the first and second side 32, 34, while the gap 125 between the inner surfaces 121, 123 measured along a plane parallel to the side wall portion 118 and at the intersection of the respective inner surfaces 121, 123 with the side wall portion 118 is greater than the thickness of the glass panel 30.

Referring back to FIGS. 7A and 7B, in addition to the at least two sides 111 and less than all sides of the plastic frame 100 including the C-shaped channel 135, another side 111 (hereinafter alternatively referred to by reference numeral 175 so as to distinguish from the at least two sides 111 including the C-shaped channel 135) of the plastic frame 100 includes the lower wall portion 117 having the aforementioned inner surface 123, as shown best on FIGS. 7A, 7B and 9. The another side 175 of the plastic frame 100 also includes the lower surface 108 opposite the inner surface 123, the inner surface 109 and the outer surface 110 as described above.

Figure 10A:
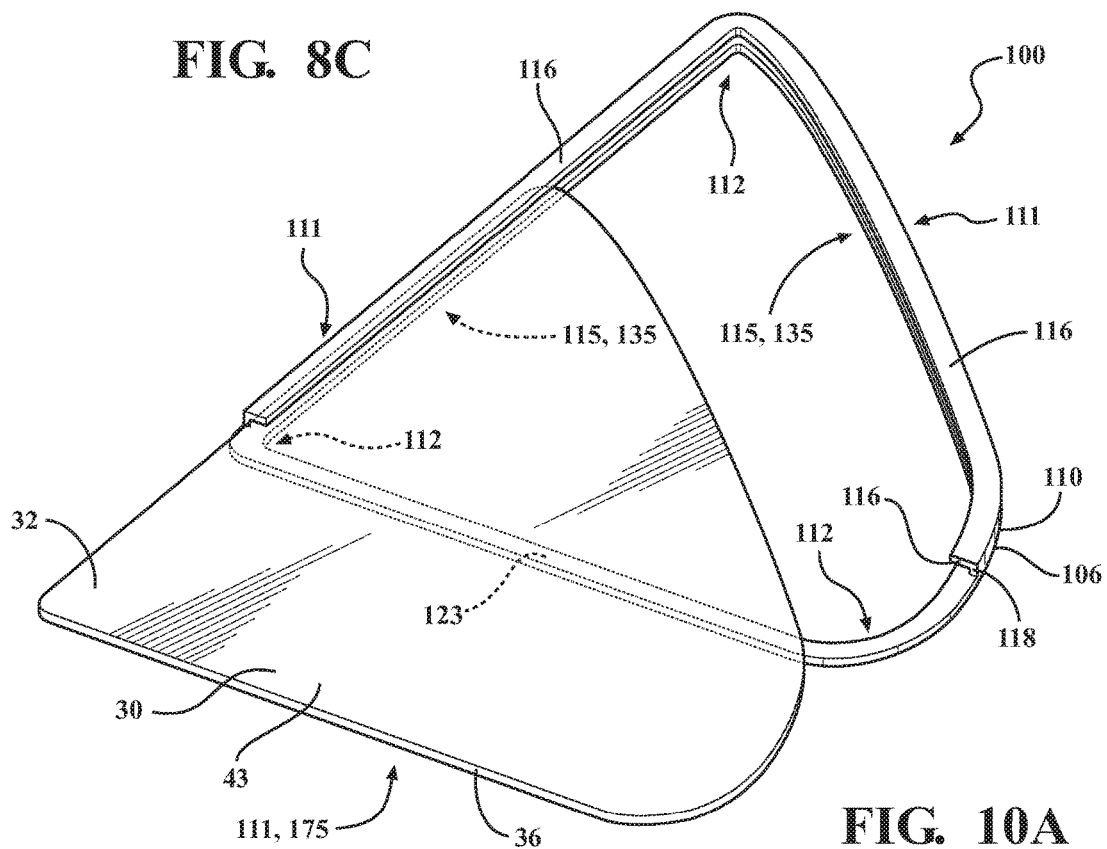
FIG. 10A is a perspective view of the glass panel and plastic frame of FIG. 7A during the coupling of the glass panel to the plastic frame.
Figure 10B:
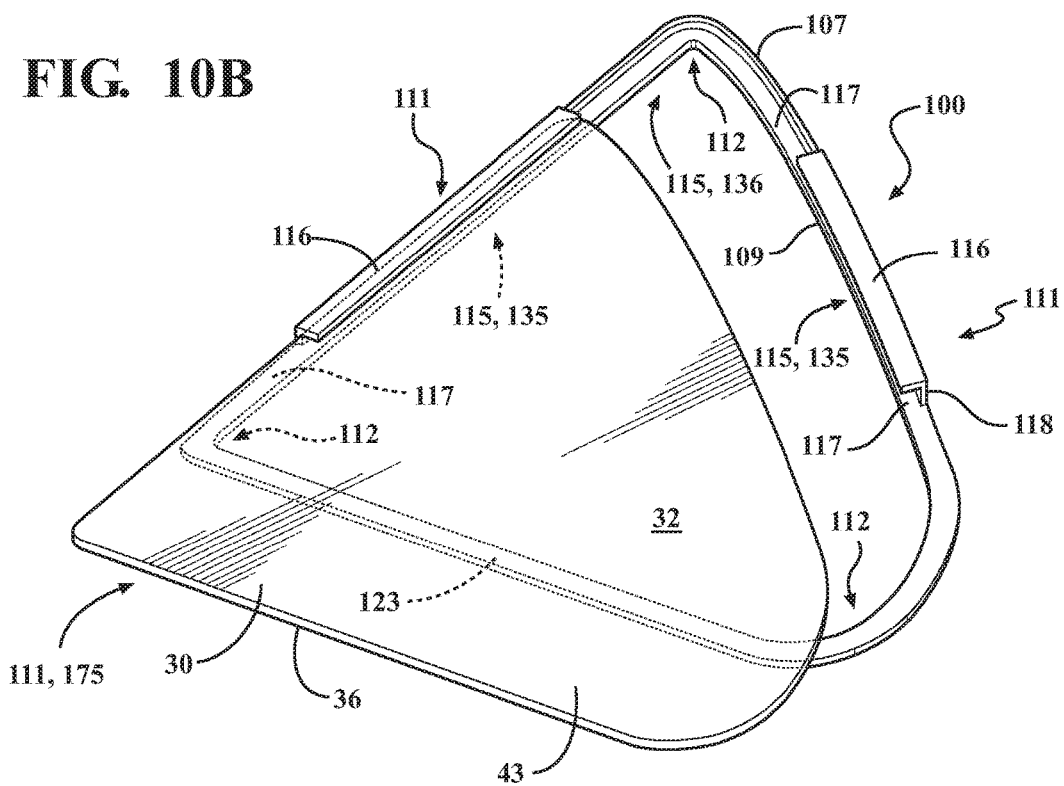
FIG. 10B is a perspective view of the glass panel and plastic frame of FIG. 7B during the coupling of the glass panel to the plastic frame.
Figure 11A:
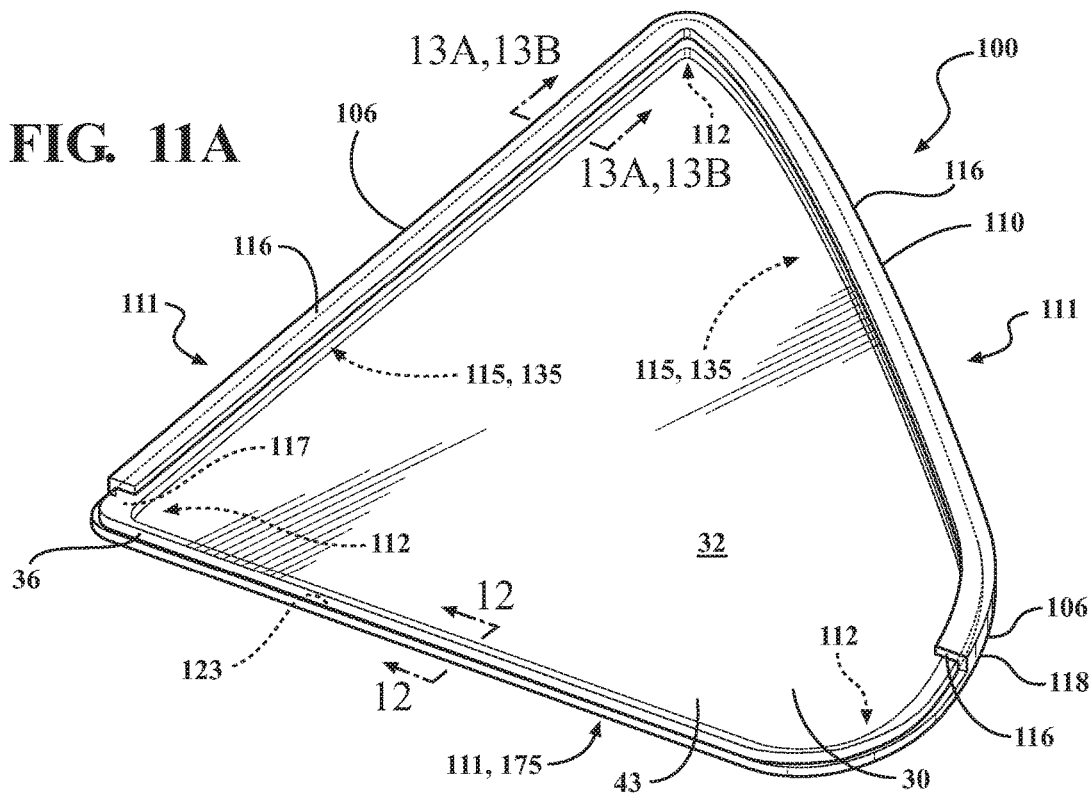
FIG. 11A is a perspective view of the glass panel and plastic frame of FIG. 7A after the coupling of the glass panel to the plastic frame.
Figure 11B:
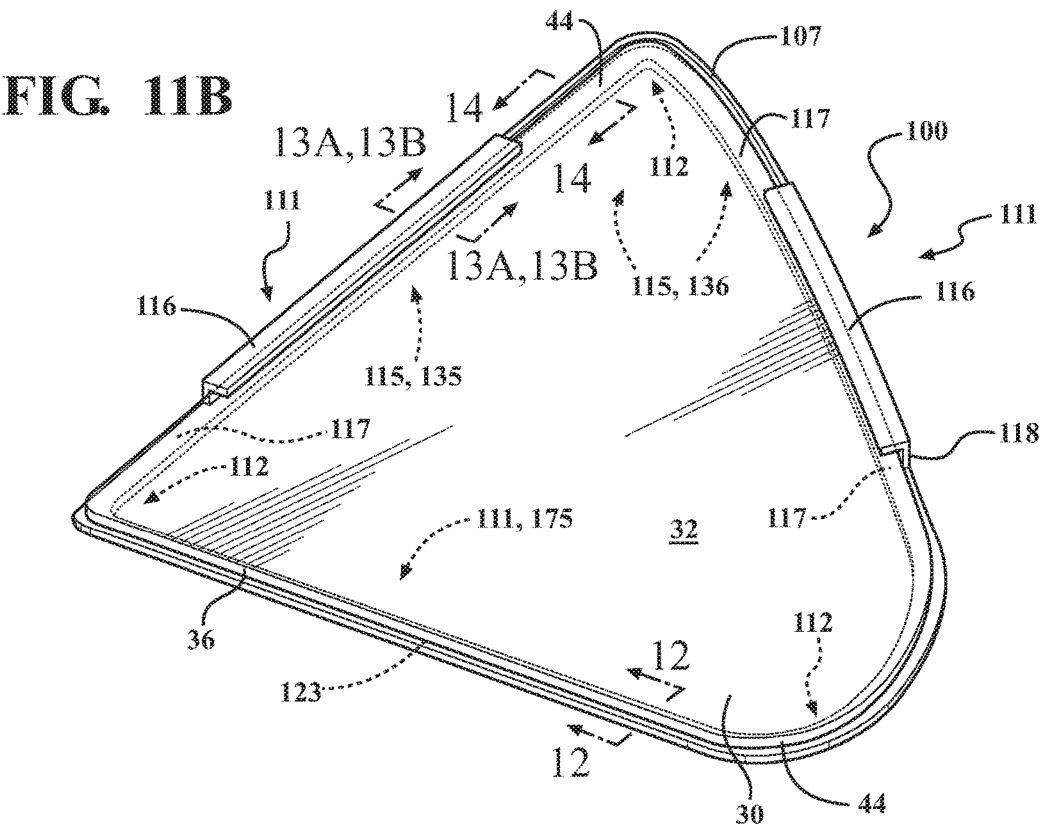
FIG. 11B is a perspective view of the glass panel and plastic frame of FIG. 7B after the coupling of the glass panel to the plastic frame.
Figure 12:
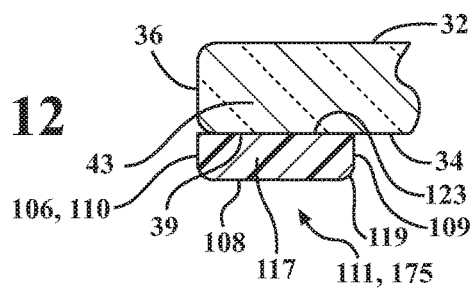
FIG. 12 is a section view of FIGS. 11A and 11B along line 12-12.
Figure 14:
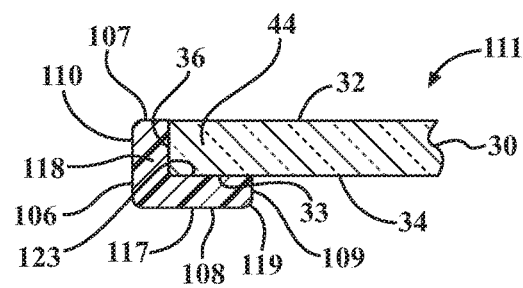
FIG. 14 is a section view of FIG. 11B taken along line 14-14.

To begin the process for coupling the glass panel 30 to the plastic frame 100, as shown in FIGS. 10A and 10B (with FIG. 10A including the plastic frame 100 of FIG. 7A; and with FIG. 10B including the plastic frame 100 of FIG. 7B), the glass panel 30 is first placed onto the inner surface 123 of the another side 175 of the plastic frame 100 such that the second side 34 of the glass panel 30 is adjacent to the inner surface 123 of the lower wall portion 117. The glass panel 30 is then slid within each one of the C-shaped channels 135 along the at least two sides 111 of the plastic frame 100 including the C-shaped channels 135 such that the edges 36 of the glass panel 30 are adjacent to the side wall portions 118 of the C-shaped channels 135 and wherein a corner 40 of the glass panel 30 is adjacent to a corresponding corner 112 of the plastic frame 100, as shown in FIGS. 11A and 11B (with FIG. 11A including the plastic frame 100 of FIG. 7A; and with FIG. 11B including the plastic frame 100 of FIG. 7B). In this position, a portion 42 of second side 34 of the glass panel 30 is adjacent to (i.e., is seated against) the inner surface 123 of the lower wall portion 117 within a respective C-shaped channel 135 of a respective side 111 of the plastic frame 100. In addition, in either embodiment of FIG. 7A or 7B, another portion 43 of the second side 34 of the glass panel 30 is adjacent to (i.e., is seated against) the inner surface 123 of the another side 175 of the plastic frame 100, as shown in FIG. 12. In addition, in embodiments in including one or more L-shaped channels 136 (such as FIG. 11B), yet another portion 44 of the second side 34 of the glass panel 30 is adjacent to (i.e., is seated against) the inner surface 123 of the lower wall portion 117 of the side 111 of the plastic frame 100 when the glass panel 30 is coupled to the plastic frame 100, while the edge 36 of the glass panel is positioned adjacent to the side wall portion 118, of each of the corresponding L-shaped channels 136, as best shown in FIG. 14.

Figure 13A:
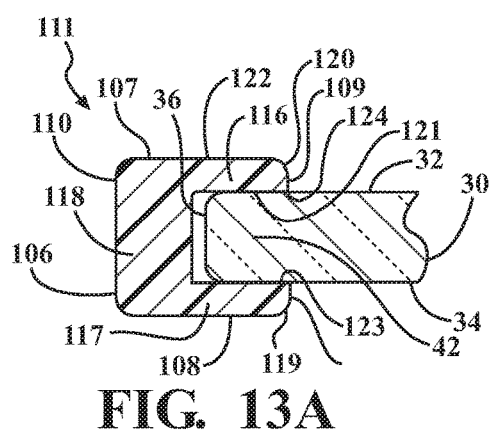
FIG. 13A is a section view of FIG. 11A or 11B taken along line 13A-13A.

In embodiments wherein plane P1 is parallel to plane P2 in the plastic frame 100, as shown in FIG. 13A, the inner surface 121 of the upper wall portion 116 is aligned and generally parallel with the first surface 32 of the glass panel 30, and the inner surface 123 of the lower wall portion 117 is aligned with and generally parallel with the second surface 34 of the glass panel 30. Accordingly, the glass panel 30 is retained within each of respective C-shaped channels 135 of the sides 111.

Figure 13B:
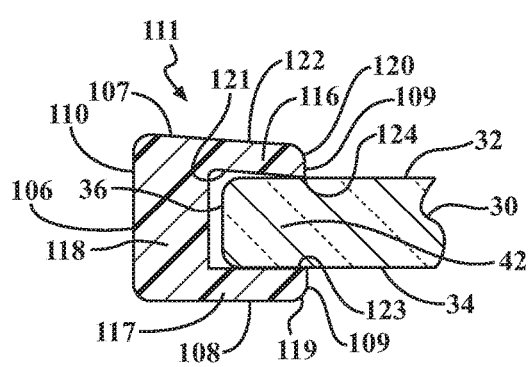
FIG. 13B is a section view of FIG. 11A or 11B taken along line 13B-13B in a modified embodiment of FIG. 13A.

Alternatively, in embodiments wherein the gap 125 between the respective inner surface 121, 123 decreases along the respective planes P1, P2 in a direction away from the side wall portion 118, as shown in FIG. 13B, the edge portion 124 of the inner surface 121 of the upper wall portion 116 remains in resilient contact with the first surface 32 of the glass panel 30, thereby aiding in securing the glass panel 30 to the plastic frame 100 within the C-shaped channel 135 of the respective sides 111.

After the glass panel 30 is fully coupled to (i.e., installed within) the plastic frame 100 in accordance with either embodiment illustrated in FIG. 11A or FIG. 11B above, the encapsulant 200 is then applied to the outer frame surface 106 and to the glass panel 30 to sealingly secure the glass panel 30 to the plastic frame 100, as illustrated in FIGS. 15-18.

Figure 15A:
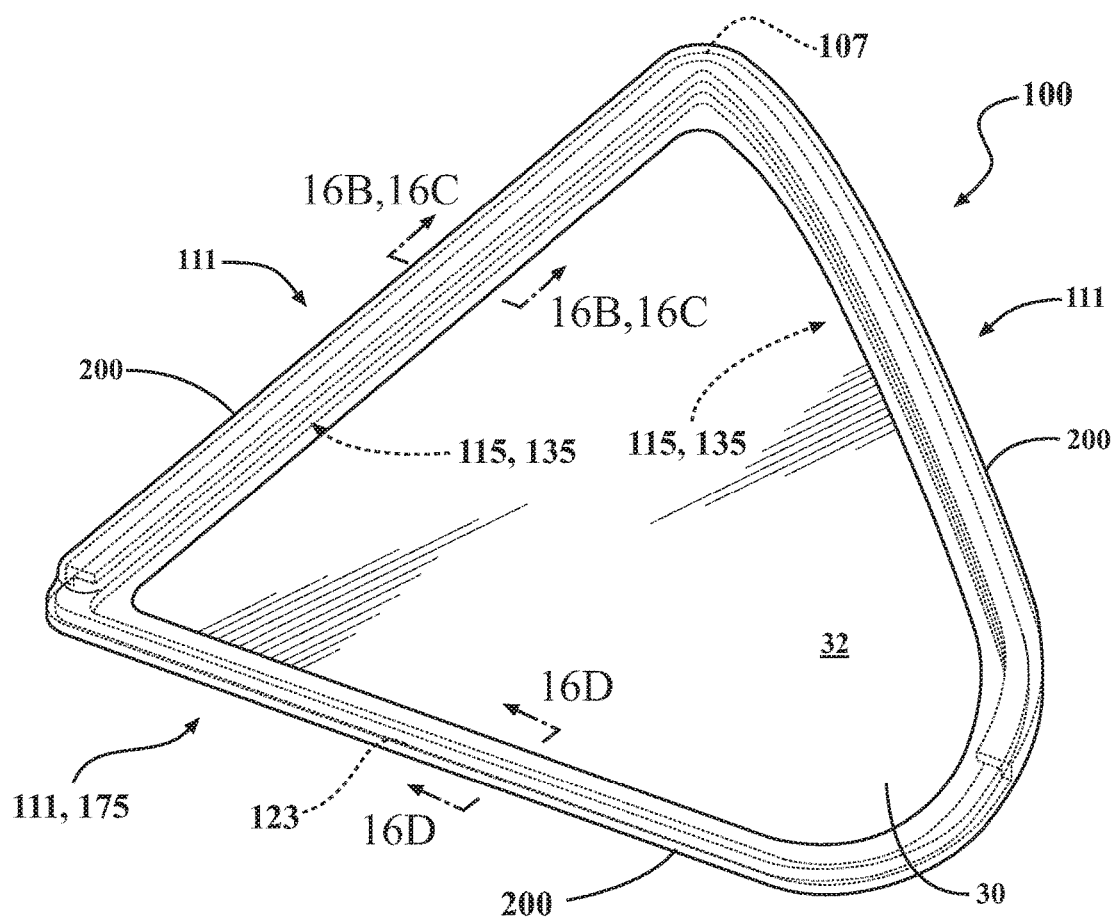
FIG. 15A is a perspective view of the encapsulated glass assembly in accordance with one embodiment of the present invention in which a two-sided encapsulant is applied to the coupled glass panel of FIG. 11A.
Figure 15B:
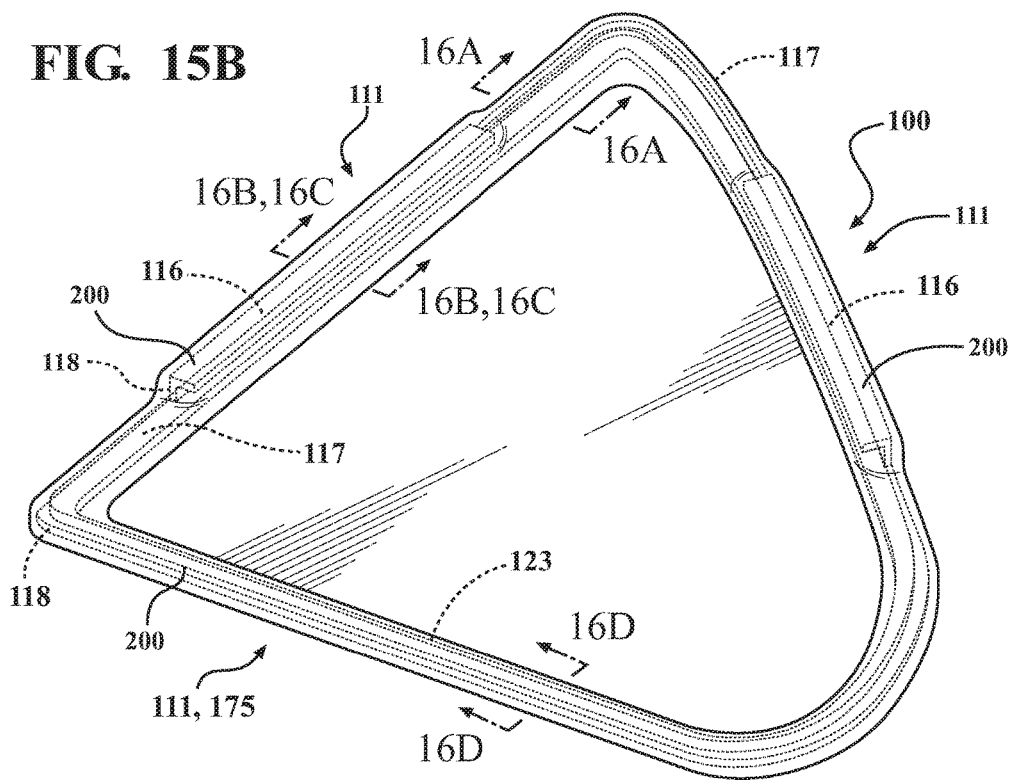
FIG. 15B is a perspective view of the encapsulated glass assembly in accordance with one embodiment of the present invention in which a two-sided encapsulant is applied to the coupled glass panel of FIG. 11B.

More specifically, in one embodiment, as shown in FIG. 15A, the encapsulant 200 is bonded over the plastic frame 100 according to the embodiment of FIG. 11A and onto a first side 32 of the glass panel 30. In another embodiment, as shown in FIG. 15B, the encapsulant 200 is bonded over the plastic frame 100 according to the embodiment of FIG. 11A and onto a first side 32 of the glass panel 30. In these embodiments, the encapsulant 200 alternatively may be referred to as a two-sided encapsulant, as it covers a portion of the first side 32 of the glass panel 30 and is coupled to the plastic frame 100 of FIG. 11A or 11B in a position corresponding to the edge 36 of the glass panel 30.

Figure 17A:
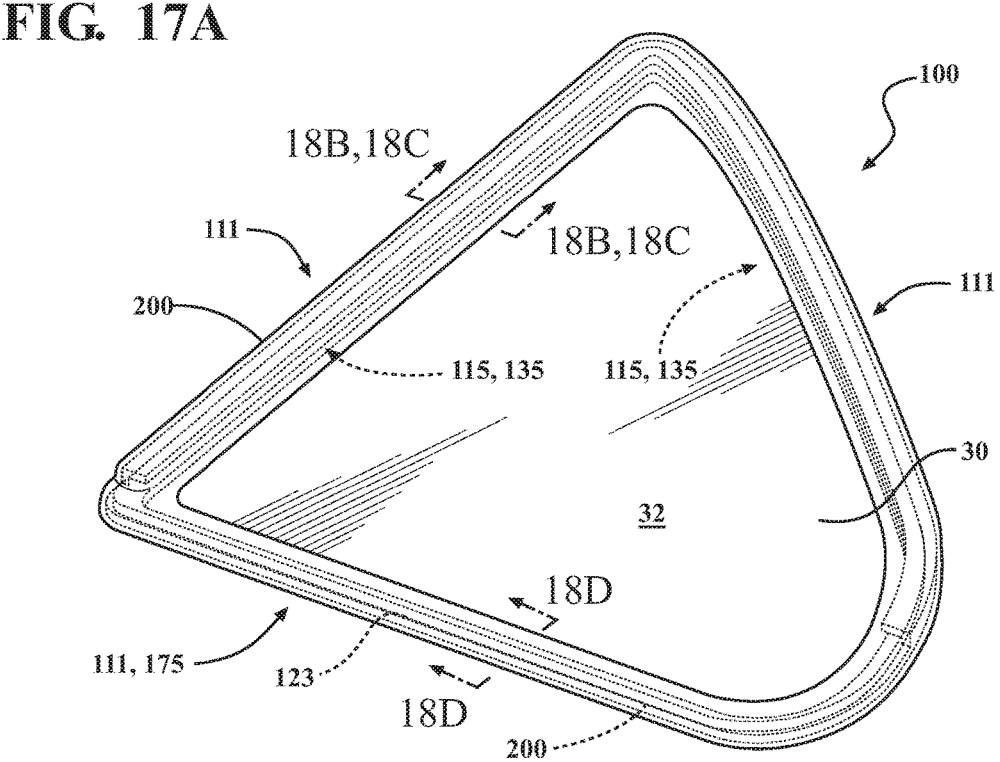
FIG. 17A is a perspective view of the encapsulated glass assembly in accordance with one embodiment of the present invention in which a three-sided encapsulant is applied to the coupled glass panel of FIG. 11A.
Figure 17B:
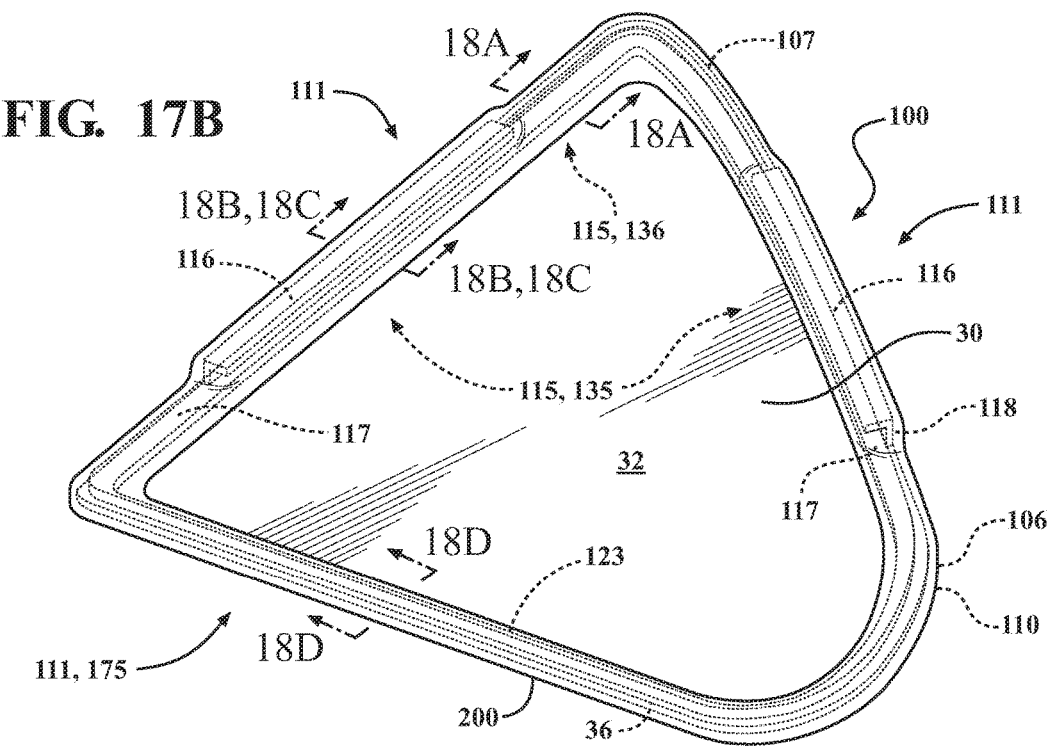
FIG. 17B is a perspective view of The encapsulated glass assembly in accordance with one embodiment of the present invention in which a three-sided encapsulant is applied to the coupled glass panel of FIG. 11B

In another embodiment, as shown in FIGS. 17A and 17B, the encapsulant 200 is also bonded onto the lower surface 108 and inner surface 109 of the lower wall portion 117 of each respective side 111 of the plastic frame 100 according to the embodiment of FIG. 11A or 11B and onto an uncovered portion 35 of the second side 34 of the glass panel 30. In this embodiment, the encapsulant 200 alternatively be referred to as a three-sided encapsulant, as it covers a portion of the first side 32 and second side 34 off the glass panel 30 and is coupled to the plastic frame 100 in a position corresponding to the edge 36 of the glass panel 30.

Figure 16A:
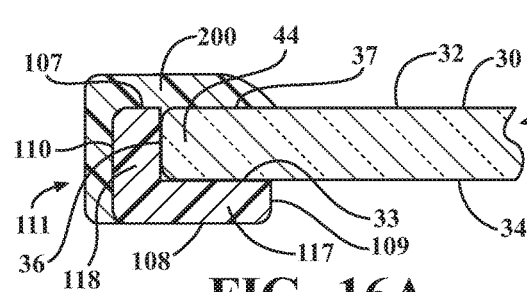
FIG. 16A is a section view of FIG. 15B taken along line 16A-16A.
Figure 16B:
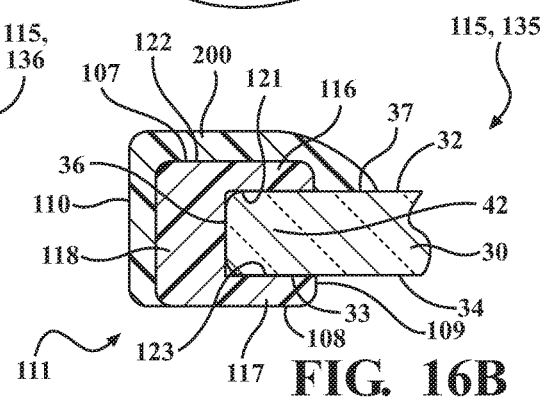
FIG. 16B is a section view of FIG. 15A or 15B taken along line 16B-16B.
Figure 16C:
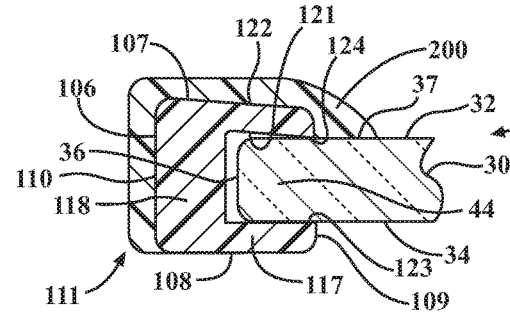
FIG. 16C is a section view of FIG. 15A or 15B taken along line 16C-16C in a modified embodiment of FIG. 16B.
Figure 16D:
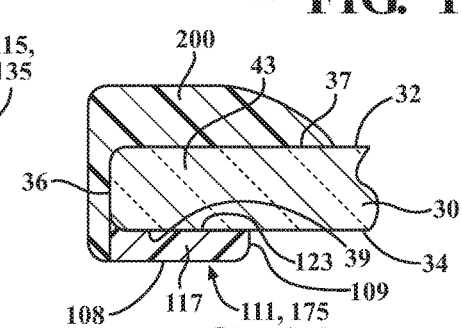
FIG. 16D is a section view of FIG. 15A or 15B taken along line 16D-16D.

Referring first to the plastic frame 100 according to the embodiment of FIG. 11A having a two-sided encapsulant 200 formed thereon, as shown in FIGS. 15A and 16B-D, the encapsulant 200 is bonded onto the outer surface 122 and inner surface 109 of the upper wall portion 116 (as shown best in FIG. 16B or 16C) and onto the outer surface 110 of the side wall portion 118 along each of the sides 111 corresponding to the C-shaped channels 135 (also as shown best in FIGS. 16B and 16C). In addition, the encapsulant 200 is also bonded onto an uncovered portion 37 of the first side 32 of the glass panel 30 extending beyond the inner surface 109 of upper wall portion 116 (as shown in FIGS. 16B and 16C) on sides 111 corresponding to the C-shaped channels 135. Still further, as shown in FIG. 16D, the encapsulant 200 is bonded onto the outer surface 110 of the another side 175 of the plastic frame 100, as well as onto the edge 36 and uncovered portion 37 of the first side 32 of the glass panel 30 corresponding to the another side 175.

Similarly, wherein the plastic frame 100 of FIG. 11A is replaced by the plastic frame of FIG. 11B and the two-sided encapsulant 200 is bonded to the plastic frame 100 and glass panel, as shown in FIGS. 15B and 16A-D, is bonded onto the outer surface 122 of the upper wall portion 116 (as shown best in FIG. 16B or 16C) and onto the outer surface 110 of the side wall portion 118 along each of the sides 111 corresponding to the C-shaped channels 135 (also as shown best in FIGS. 16B and 16C). In addition, the encapsulant 200 is also bonded onto an uncovered portion 37 of the first side 32 of the glass panel 30 extending beyond the inner surface 109 of the upper wall portion 116 (as shown in FIGS. 16B and 16C) on sides 111 corresponding to the C-shaped channels 135. Still further, on sides 111 of the plastic frame 100 including a respective L-shaped channel 136, as shown in FIG. 16A, the encapsulant 200 is bonded onto the upper surface 107 and the outer surface 110 of the side wall portion 118 is also bonded onto an uncovered portion 37 of the first side 32 of the glass panel 30 extending inward beyond the upper surface 107 of the side wall portion 118. Even still further, as shown in FIG. 16D, the encapsulant 200 is bonded onto the outer surface 110 of the another side 175 of the plastic frame 100, as well as onto the edge 36 and uncovered portion 37 of the first side 32 of the glass panel 30 corresponding to the another side 175.

Figure 18A:
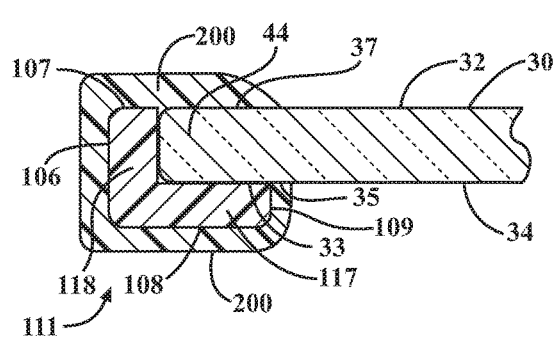
FIG. 18A is a section view of FIG. 17B taken along line 18A-18A.
Figure 18B:
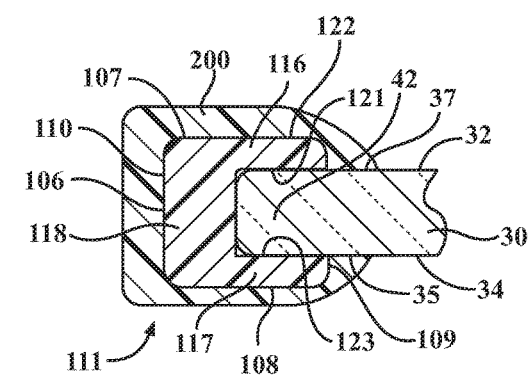
FIG. 18B is a section view of FIG. 17A or 17B taken along line 18B-18B.
Figure 18C:
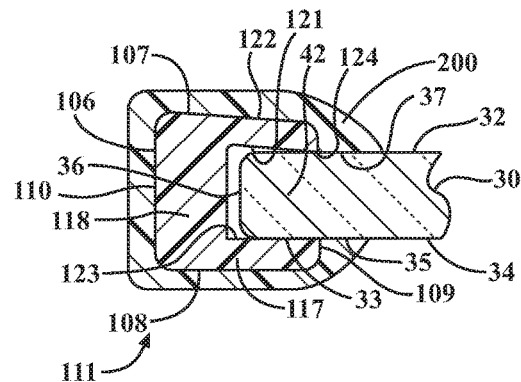
FIG. 18C is a section view of FIG. 17A or 17B taken along line 18C-18C in a modified embodiment of FIG. 16B.
Figure 18D:
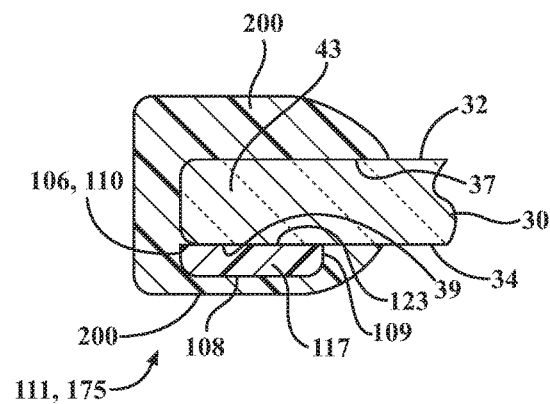
FIG. 18D is a section view of FIG. 17A or 17B taken along line 18D-18D.

Referring next to the plastic frame 100 according to the embodiment of FIG. 11A having a three-sided encapsulant 200 formed thereon, as shown in FIGS. 17A and 18B-D, the encapsulant 200 is bonded onto the outer surface 122 and inner surface 109 of the upper wall portion 116 (as shown best in FIG. 18B or 18C), onto the outer surface 110 of the side wall portion 118, and onto the lower surface 108 and inner surface 109 of the lower wall portion 1177 along each of the sides 111 corresponding to the C-shaped channels 135 (also as shown best in FIGS. 18B and 18C). In addition, the encapsulant 200 is also bonded onto an uncovered portion 37 of the first side 32 of the glass panel 30 extending beyond the inner surface 109 of the upper wall portion 116 (as shown in FIGS. 18B and 18C) on sides 111 corresponding to the C-shaped channels 135. Still further, the encapsulant 200 is also bonded onto an uncovered portion 35 of the second side 34 of the glass panel 30 extending beyond the inner surface 109 of the lower wall portion 117 (as shown in FIGS. 18B and 18C) on sides 111 corresponding to the C-shaped channels 135. Even still further, as shown in FIG. 18D, the encapsulant 200 is bonded onto the outer surface 110, the lower surface 108, and the inner surface 109 of the another side 175 of the plastic frame 100, as well as onto the edge 36, the uncovered portion 37 of the first side 32 of the glass panel 30, and the uncovered portion 35 of the second side 34 of the glass panel 30 extending beyond the lower wall portion 117 of the another side 175 of the plastic frame 100.

Similarly, wherein the plastic frame 100 of FIG. 11A is replaced by the plastic frame of FIG. 11B and having a three-sided encapsulant 200 formed thereon, as shown in FIGS. 17B and 18A-D, the encapsulant 200 is bonded onto the outer surface 122 and inner surface 109 of the upper wall portion 116 (as shown best in FIG. 18B or 18C), onto the outer surface 110 of the side wall portion 118, and onto the lower surface 108 and inner surface 109 of the lower wall portion 117 along each of the sides 111 corresponding to the C-shaped channels 135 (also as shown best in FIGS. 18B and 18C). In addition, the encapsulant 200 is also bonded onto an uncovered portion 37 of the first side 32 of the glass panel 30 extending beyond the inner surface 109 of the upper wall portion 116 (as shown in FIGS. 18B and 18C) on sides 111 corresponding to the C-shaped channels 135. Still further, the encapsulant 200 is also bonded onto an uncovered portion 35 of the second side 34 of the glass panel 30 extending beyond the inner surface 109 of the lower wall portion 117 (as shown in FIGS. 18B and 18C) on sides 111 corresponding to the C-shaped channels 135. Still further, on sides 111 of the plastic frame 100 including a respective L-shaped channel 136, as shown in FIG. 18A, the encapsulant 200 is bonded onto the upper surface 107 and the outer surface 110 of the side wall portion 118, onto the lower surface 108 and inner surface 109 of the lower wall portion 117, is also bonded onto an uncovered portion 37 of the first side 32 of the glass panel 30 extending inward beyond the upper surface 107 of the side wall portion 118 as well as being bonded onto an uncovered portion 35 of the second side 34 of the glass panel 30 extending beyond the inner surface 109 of the lower wall portion 117. Even still further, as shown in FIG. 18D, the encapsulant 200 is bonded onto the outer surface 110, the lower surface 108, and the inner surface 109 of the another side 175 of the plastic frame 100, as well as onto the edge 36, the uncovered portion 37 of the first side 32 of the glass panel 30, and the uncovered portion 35 of the second side 34 of the glass panel 30 extending beyond the lower wall portion 117 of the another side 175 of the plastic frame 100.

As noted above, in addition to the glass panel 30 and plastic frame 100 as described above in accordance with any embodiment, the encapsulated glass assembly 25 also includes an encapsulant 200 which is bonded to at least one of the first side 32 and the second side 34 of the glass panel 30 and which is also bonded to the outer surface of the plastic frame 100 and therefore secures the glass panel 30 to the plastic frame 100.

The encapsulant 200 has a Shore hardness that is less than the Shore Hardness of the respective plastic frame 100. In other words, the encapsulant 200 is softer than the respective plastic frame 100. Still further, the encapsulant 200 sealingly bonds to the glass panel 30 and therefore provides a moisture seal to prevent water migration between the glass panel 30 and the encapsulant 200 that could not be achieved using polypropylene encapsulants.

The Shore Hardness of the encapsulant 200 is dependent upon the composition of the encapsulating material used to form the encapsulant 200. However, as noted above, the Shore hardness of the encapsulant 200, in any embodiment of the present invention as described above and regardless of the composition of the encapsulating material used to form the encapsulant, is less than the Shore hardness of the plastic frame 100.

In certain embodiments, the encapsulating material used to form the encapsulant 200 is a thermoplastic elastomer, or TPE (i.e., it is a TPE-based encapuslating material). Accordingly, in these embodiments, the encapsulant 200 is, or otherwise may be referred to, as TPE. Exemplary TPE-based materials that can be used as the encapsulating material is SBS (poly(styrene-butadiene-styrene), also alternatively referred to as a styrene-butadiene-styrene block copolymer), and SEBS (styrene-ethylene-butylene-styrene block copolymers). Exemplary TPE materials such as SBS and SEBS form encapsulants 200 having a Shore hardness ranging from 0A to 60D, as measured in accordance with ASTM D2240.

To form the encapsulant 200 from the encapsulating material and in accordance with any of the embodiments above, in one exemplary method of the present invention, after the glass frame 30 is installed within the respective plastic frame 100, the installed glass frame and plastic frame 100 are placed into a mold (not shown), such an injection mold, wherein an encapsulant 200 is molded onto one or both of the first side 32 and second side 34 of the glass panel 30 and onto the outer surface of the plastic frame 100 to sealingly secure the plastic frame 100 to the glass panel 30. The encapsulant 200 is formed by introducing the encapsulating material, as described above, in a flowable or liquid form and at a desired pressure within the cavity portion of the mold and onto the at least one of the first side and the second side of the glass panel and onto the outer surface of the plastic frame 100. To ensure that the encapsulating material (which is non-flowable and/or non-liquid at temperatures such as room temperature or ambient temperature and also at temperatures typically experienced by vehicles to which it is coupled during operating conditions) is in a flowable or a liquid form for introduction into the cavity of the mold, the encapsulating material is first heated to a flowable temperature sufficient to wherein the encapsulating material is in flowable and/or a liquid form. The desired pressure is sufficient to allow the encapsulating material to fill the cavity portion of the mold and contact the portions of the glass panel 30 and plastic frame 100 for bonding as desired but insufficient to cause premature opening of the mold and flash. Once the encapsulating material is cooled to harden the encapsulating material from its liquid or its flowable form to a non-liquid (i.e., solid) or non-flowable form to form the encapsulant 200, the encapsulated glass assembly 25 may be removed from the mold. In most plastics used as the encapsulating material herein, the flowable temperature of the encapsulating material corresponds to a temperature greater than its glass transition temperature, and thus the encapsulating material is introduced at a temperature above its glass transition temperature to fill the cavity, and subsequently cooled to a temperature below its glass transition temperature to form the encapsulant 200.

Optionally, the encapsulant 200 may be formed in a single step or in multiple steps in associated exemplary methods for application of the present invention. For example, a first encapsulating material may be applied to a first portion of the respective frame 100 and to one of the first side 32 or second side 34 the glass panel 30, and a second encapsulating material 200 may be applied to another portion of the respective frame 100 and to other one of the first side 32 or second side 34 of the glass panel. In further embodiments, the first and second encapsulating material may be integrally formed, while in further embodiments the first and second encapsulating material may form separate encapsulants 200 for the encapsulated glass assembly 25, but wherein the first and second encapsulating materials form a single integral encapsulant 200. In certain embodiments, the first encapsulating material and the second encapsulating material, when separately applied, are formed from the same polymeric material. In yet further embodiments, the first encapsulating material and second encapsulating material are formed from different polymeric materials.

The temperatures and pressures used to form the encapsulant 200 within the mold, and in particular within the injection mold in accordance with one exemplary method of application, are dependent upon numerous factors, including but not limited to the type of encapsulating material used, the type of characteristics of the molding equipment used (including mold temperature, melt temperature, nozzle temperature, zone temperatures, and feed temperatures), and to a lesser extent the desired shape and thickness of the encapsulant 200 applied onto the glass frame 100 and glass panel 30. Notably, because the encapsulating material used to form the encapsulant 200 as described above may be molded at relatively low pressures and temperatures within the mold, such as the injection mold described above, the risk of cracking or breaking the glass panel 30 during the molding process is minimized or prevented.

Exemplary injection molding equipment having these molding characteristics that may be used in the exemplary application methods of the present invention include, but are not limited, those sold commercially from Krauss-Maffei Corporation of Munich, Germany (described above with respect to molding the plastic frame 100).

When TPEs such as SBS or SEBS are utilized as the encapsulating material (i.e., the encapsulating material is a TPE-based encapsulating material such as SBS or SEBS) and the material is injection molded onto the glass panel using conventional injection molding equipment (such as those sold commercially from Krauss-Maffei Corporation), in one exemplary method of the present invention, the molding conditions are as follows: mold temperatures ranging from about 100 to 130 degrees Fahrenheit (about 38 to 55 degrees Celsius); injection pressures ranging from about 3000 to 4500 pounds per square inch (about 2.07 to 3.10 MPa (MegaPascals)); barrel temperatures ranging from about 400 to 430 degrees Fahrenheit (about 204 to 221 degrees Celsius), and fill times ranging from 2.1 to 2.6 seconds.

Notably, these injection pressures are generally lower than the corresponding injection pressures, at corresponding or lower barrel temperatures and at slower fill times, as compared with molding conditions required to mold polypropylene encapsulants onto glass as described above. Improvement in any one of the factors (lower injection pressure; lower molding and barrel temperatures; and increased fill times) much less a combination of any two or more of these factors, is believed to decrease the risk of glass panel 30 breakage during the molding process.

After cooling, the mold is released, and the encapsulated glass assembly 25 is formed that includes the glass panel 30, plastic frame 100, and the encapsulant 200.

The present invention thus provides simplified glass assemblies having high strength and a simplified manufacturing process. In addition, the coupling of the plastic frame and encapsulant to the glass panel in accordance with the present invention forms glass assemblies with high strength that cannot be achieved using the one-shot or two-shot encapsulation techniques that form softer enclosures. Still further, the application of the encapsulating material to form an encapsulant onto the glass panel and frame to secure the glass panel to the frame in accordance with the present invention may be done at lower temperatures and pressures than required to bond high hardness plastic materials such as polypropylene to the glass panel as the encapsulant, thus minimizing or preventing the breakage of the glass panels during the application process. Accordingly, the present invention allows the use of lower strength and better acoustical glass panels, such as laminated glass panels, in this manufacturing process.

The present invention has been described herein in an illustrative manner. It is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. An encapsulated glass assembly comprising:
   a glass panel having a first side and a second side and an edge between said first side and said second side;
   a plastic frame coupled to said glass panel, said plastic frame having at least three sides and having a corner located between each adjacent side and including an outer frame surface, each of said at least three sides including a lower wall portion extending within said outer frame surface, said lower wall portion including an inner surface,
   wherein at least two and less than all of said at least three sides of said plastic frame include a C-shaped channel extending within said outer frame surface, wherein each one of said C-shaped channels has said lower wall portion and an upper wall portion and a side wall portion connecting said lower wall portion to said upper wall portion, said lower wall portion spaced from said upper wall portion;
   wherein another one side of said at least three sides of said plastic frame includes said lower wall portion but does not include a C-shaped channel;
   wherein said glass panel is coupled to said plastic frame such that said glass panel is contained within each one of said C-shaped channels and such that an edge portion of said second side of said glass panel is adjacent to said inner surface of said lower wall portion along said another one side of said at least three sides of said plastic frame; and an encapsulant bonded to at least one of said first side and said second side of said glass panel and bonded onto said outer frame surface of said plastic frame to secure said glass panel to said plastic frame, said encapsulant having a Shore hardness less than a Shore hardness of said plastic frame.

2. The encapsulated glass assembly according to claim 1, wherein said encapsulant is bonded to each of said first side and said second side of said glass panel to secure said glass panel to said plastic frame.

3. The encapsulated glass assembly according to claim 1, wherein said plastic frame comprises a single C-shaped channel, said single C-shaped channel extending along at least two adjacent sides of said plastic frame.

4. The encapsulated glass assembly according to claim 1, said plastic frame comprises a pair of said C-shaped channels, a first one of said pair of C-shaped channel extending along a first side of said at least two sides of said plastic frame and a second one of said pair of C-shaped channels extending along a second side of said at least two sides, said second side different from said first side.

5. The encapsulated glass assembly according to claim 4, wherein said first side extends between a first corner and a second corner, and wherein said C-shaped channel on said first side of said plastic frame extends an entire length of said first side from said first corner to said second corner.

6. The encapsulated glass assembly according to claim 4, wherein said first side extends between a first corner and a second corner, and wherein said C-shaped channel on said first side of said plastic frame does not extend an entire length of said first side from said first corner to said second corner.

7. The encapsulated glass assembly according to claim 1, wherein a first side of said at least two sides including said C-shaped channel includes at least two spaced apart C-shaped channels.

8. The encapsulated glass assembly according to claim 7, wherein an L-shaped channel is disposed between said at least two spaced apart C-shaped channels on said first side of said plastic frame, said L-shaped channel including said side wall portion connected to said lower wall portion.

9. The encapsulated glass assembly according to claim 1, wherein an edge section of at least one of said at least one upper wall portions is in resilient contact with said portion of said first side of said glass panel.

10. The encapsulated glass assembly according to claim 1, wherein said plastic frame has a Shore D hardness of from 55 to 95.

11. The encapsulated glass assembly according to claim 1, wherein said encapsulant comprises TPE.

12. The encapsulated glass assembly according to claim 1, wherein said plastic frame comprises a polypropylene plastic frame.

13. The encapsulated glass assembly according to claim 1, further comprising a primer disposed on one of said first side and said second side of said glass panel such that said primer bonds said glass panel to said encapsulant.

14. The encapsulated glass assembly according to claim 1, wherein the glass panel comprises a laminated glass panel or a tempered glass panel.

15. A vehicle including the encapsulated glass assembly of claim 1.

16. A method for forming an encapsulated glass assembly including a glass panel having a first and a second side and an edge connecting the first side to the second side, said method comprising:

forming a plastic frame having at least three sides and having a corner located between each adjacent side and including an outer frame surface, each of the at least three sides including a lower wall portion extending within the outer frame surface, the lower wall portion including an inner surface, wherein at least two and less than all of the at least three sides of the plastic frame include a C-shaped channel extending within the outer frame surface, wherein each one of the C-shaped channels has the lower wall portion and an upper wall portion and a side wall portion connecting the lower wall portion to the upper wall portion, the lower wall portion spaced from the upper wall portion;

wherein another one side of the at least three sides of the plastic frame includes the lower wall portion but does not include a C-shaped channel;

coupling the glass panel to the plastic frame by introducing the glass panel onto the inner surface of the lower wall portion of the another one side and then sliding the glass panel within each one of the C-shaped channels such that the glass panel is contained within each one of the C-shaped channels and such that an edge section of the second side of the glass panel is adjacent to the inner surface of the another one side of the plastic frame;

introducing an encapsulating material in a flowable form or in a liquid form onto at least one of the first side and the second side of the glass panel and onto the outer frame surface of the plastic frame; and cooling the encapsulating material to harden the encapsulating material to form an encapsulant to secure the glass panel to the plastic frame, the encapsulant bonded to the at least one of the first side and the second side of the glass panel and bonded onto the outer frame surface of the plastic frame, the encapsulant having a Shore hardness less than a Shore hardness of the plastic frame.

17. The method according to claim 16, wherein the step of introducing an encapsulating material comprises introducing an encapsulating material at a temperature greater than the glass transition temperature of the encapsulating material onto the first side and the second side of the glass panel and onto the outer frame surface of the plastic frame.

18. The method according to claim 16, wherein the plastic frame comprises a single C-shaped that extends along at least two adjacent sides of the plastic frame, and wherein the step of coupling the glass panel to the plastic frame comprises:

coupling the glass panel to the plastic frame by introducing the glass panel onto the inner surface of the lower wall portion of the another one side and then sliding the glass panel within the single C-shaped channel such that the glass panel is contained within the single C-shaped channel and such that an edge section of the second side of the glass panel is adjacent to the inner surface of the another one side of the plastic frame.

19. The method according to claim 16, wherein the plastic frame comprises a pair of the C-shaped channels, a first one of the pair of C-shaped channel extending along a first side of the at least two sides of the plastic frame and a second one of the pair of C-shaped channels extending along a second side of the at least two sides, the second side different from the first side, and wherein the step of coupling the glass panel to the plastic frame comprises:

coupling the glass panel to the plastic frame by introducing the glass panel onto the inner surface of the lower wall portion of the another one side, and then sliding the glass panel within the respective C-shaped channel of each of the first side and the second side of the plastic frame such that the glass panel is contained within the respective C-shaped channel of each of the first side and the second side of the plastic frame and that an edge section of the second side of the glass panel is adjacent to the inner surface of the another one side of the plastic frame.

20. A glass assembly formed in accordance with claim 16.

21. A vehicle including the encapsulated glass assembly formed by the method of claim 16.

\* \* \* \* \*